(12) United States Patent
Niwa

(10) Patent No.: US 12,356,097 B2
(45) Date of Patent: Jul. 8, 2025

(54) IMAGING DEVICE, ELECTRONIC APPARATUS, AND IMAGING METHOD

(71) Applicant: Sony Semiconductor Solutions Corporation, Kanagawa (JP)

(72) Inventor: Atsumi Niwa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 326 days.

(21) Appl. No.: 17/785,187

(22) PCT Filed: Jan. 21, 2021

(86) PCT No.: PCT/JP2021/002113
§ 371 (c)(1),
(2) Date: Jun. 14, 2022

(87) PCT Pub. No.: WO2021/153428
PCT Pub. Date: Aug. 5, 2021

(65) Prior Publication Data
US 2023/0008577 A1 Jan. 12, 2023

(30) Foreign Application Priority Data
Jan. 29, 2020 (JP) .................................. 2020-012841

(51) Int. Cl.
*H04N 25/75* (2023.01)
*H04N 25/63* (2023.01)
*H04N 25/709* (2023.01)

(52) U.S. Cl.
CPC ............. *H04N 25/75* (2023.01); *H04N 25/63* (2023.01); *H04N 25/709* (2023.01)

(58) Field of Classification Search
CPC ........ H04N 25/79; H04N 25/50; H04N 25/78; H04N 25/77; H04N 25/709; H04N 25/63; H04N 25/75
See application file for complete search history.

(56) References Cited

U.S. PATENT DOCUMENTS

2008/0259177 A1   10/2008   Oike
2014/0022427 A1   1/2014   Goto
(Continued)

FOREIGN PATENT DOCUMENTS

CN   101083725 A   12/2007
CN   101777566 A   7/2010
(Continued)

OTHER PUBLICATIONS

International Search Report (PCT/ISA/210), International Application No. PCT/JP2021/002113, dated Apr. 13, 2021.

*Primary Examiner* — Xi Wang
(74) *Attorney, Agent, or Firm* — Michael Best & Friedrich LLP

(57) ABSTRACT

Imaging devices are disclosed. In one example, an imaging device includes a photoelectric conversion unit with plural photoelectric conversion elements, a detector that outputs a detection signal indicating whether or not an amount of change in the electric signal of each of the photoelectric conversion elements exceeds a predetermined threshold value, a pixel signal generation unit that generates a pixel signal on the basis of the electric signal, a transfer controller that controls transfer of the electric signal to the pixel signal generation unit, and an analog-to-digital converter that converts the pixel signal into a digital signal. The low-potential-side reference potentials of the photoelectric conversion unit, the detector, the pixel signal generation unit, and the analog-to-digital converter, and the off-potential of the transfer controller include three or more potentials having different potential levels.

21 Claims, 21 Drawing Sheets

(56) References Cited

U.S. PATENT DOCUMENTS

| | | | |
|---|---|---|---|
| 2019/0166323 A1* | 5/2019 | Saito | H04N 25/78 |
| 2023/0209224 A1* | 6/2023 | Zhu | H04N 25/75 |
| | | | 348/308 |

FOREIGN PATENT DOCUMENTS

| | | |
|---|---|---|
| CN | 109698917 A | 4/2019 |
| EP | 3745710 A1 | 12/2020 |
| JP | 2006-319684 A | 11/2006 |
| JP | 2014-209696 A | 11/2014 |
| JP | 2016-533140 A | 10/2016 |
| JP | 2019-195135 A | 11/2019 |
| WO | WO-2015129197 A1 | 9/2015 |
| WO | 2017/013806 A1 | 1/2017 |
| WO | WO-2019146527 A1 | 8/2019 |
| WO | WO-2019211949 A1 | 11/2019 |

* cited by examiner

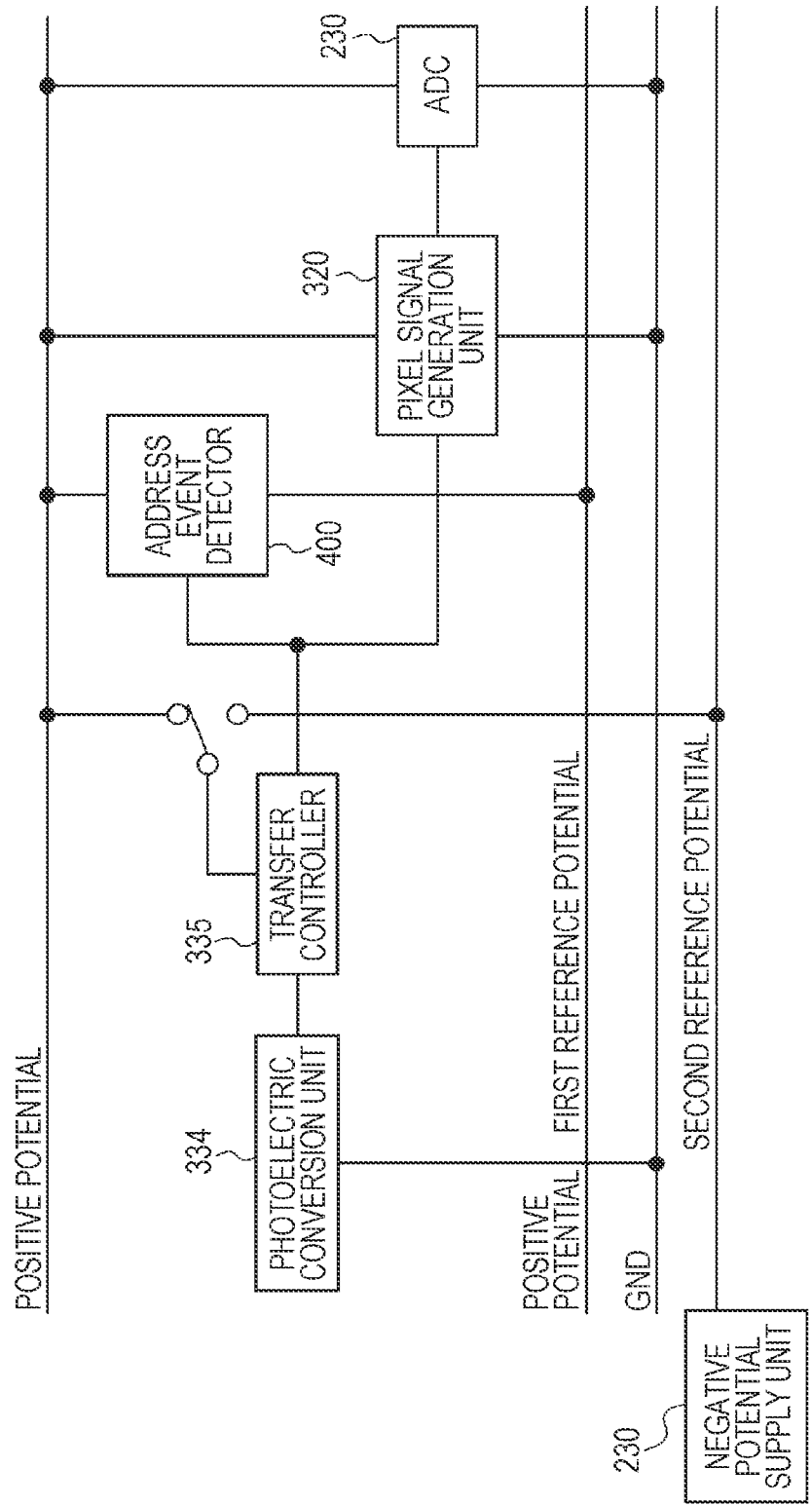

IMAGING DEVICE, ELECTRONIC APPARATUS, AND IMAGING METHOD

TECHNICAL FIELD

The present disclosure relates to an imaging device, an electronic apparatus, and an imaging method.

BACKGROUND ART

In a conventional imaging device, synchronous imaging elements that capture image data (frames) in synchronization with a synchronization signal such as a vertical synchronization signal are generally used. This type of synchronous imaging element can only acquire image data in one cycle time (for example, 1/60 seconds) of the synchronization signal, and thus is not suitable for use in acquiring image data at a higher speed. Therefore, asynchronous imaging elements have been proposed in which an event detection circuit that detects, for each pixel address, the fact that a light amount of the pixel exceeds a threshold value as an event in real time is provided for each pixel (see, for example, Patent Document 1). In these imaging elements, a photodiode and a plurality of transistors for detecting an event are disposed for each pixel.

CITATION LIST

Patent Document

Patent Document 1: Published Japanese Translation No.

SUMMARY OF THE INVENTION

Problems to be Solved by the Invention

In the above-described asynchronous imaging elements, data can be generated and output at a much higher speed than in synchronous imaging elements. For this reason, for example, in the traffic field, it is possible to improve safety by executing processing of recognizing an image of a person or an obstacle at high speed. However, when a reverse bias of a photodiode decreases due to voltage fluctuation such as a decrease in power supply voltage or an increase in ground voltage, the sensitivity of the photodiode may decrease, and the dark current may increase. Therefore, there is a problem that the signal quality is deteriorated due to the insufficient sensitivity and the dark current. Increasing the area of the photodiode can improve the sensitivity and reduce the dark current, but this is not desirable because it reduces the number of pixels per unit area. Furthermore, the sensitivity can be improved and the dark current can be reduced by sufficiently increasing the power supply voltage, but the power consumption is thus increased, which is not preferable.

The present disclosure provides an imaging device, an electronic apparatus, and an imaging method capable of improving the sensitivity, reducing the dark current, and reducing the power consumption.

Solutions to Problems

In order to solve the above problems, according to the present disclosure, there is provided an imaging device including a photoelectric conversion unit including a plurality of photoelectric conversion elements each of which photoelectrically converts incident light to generate an electric signal, a detector configured to output a detection signal indicating whether or not an amount of change in the electric signal of each of the plurality of photoelectric conversion elements exceeds a predetermined threshold value, a pixel signal generation unit configured to generate a pixel signal on the basis of the electric signal, a transfer controller configured to perform control to transfer the electric signal to the pixel signal generation unit, and an analog-to-digital converter configured to convert the pixel signal into a digital signal, in which a low-potential-side reference potential of the photoelectric conversion unit, a low-potential-side reference potential of the detector, a low-potential-side reference potential of the pixel signal generation unit, a low-potential-side reference potential of the analog-to-digital converter, and an off-potential of the transfer controller include three or more potentials having different potential levels.

A potential level of the low-potential-side reference potential of the photoelectric conversion unit may be lower than a potential level of the low-potential-side reference potential of the detector.

A potential level of the low-potential-side reference potential of the photoelectric conversion unit may be higher than a potential level of the off-potential of the transfer controller.

The potential level of the low-potential-side reference potential of the photoelectric conversion unit may be lower than the potential level of the low-potential-side reference potential of at least one of the pixel signal generation unit and the analog-to-digital converter.

At least one of the low-potential-side reference potential of the photoelectric conversion unit, the low-potential-side reference potential of the detector, the low-potential-side reference potential of the pixel signal generation unit, the low-potential-side reference potential of the analog-to-digital converter, and the off-potential of the transfer controller may be a ground potential, at least one of the others may be a first reference potential having a potential level lower than the ground potential, and at least one of the others may be a second reference potential having a potential level lower than the first reference potential.

The low-potential-side reference potential of the photoelectric conversion unit may be the second reference potential, the low-potential-side reference potentials of the detector, the pixel signal generation unit, and the analog-to-digital converter may be the ground potential, and the off-potential of the transfer controller may be the second reference potential.

The ground potential may be 0 V, the first reference potential may be a negative potential, and the second reference potential may be a negative potential having a potential level lower than that of the first reference potential.

The low-potential-side reference potentials of the photoelectric conversion unit, the pixel signal generation unit, and the analog-to-digital converter may be substantially equal.

At least one of the low-potential-side reference potential of the photoelectric conversion unit, the low-potential-side reference potential of the detector, the low-potential-side reference potential of the pixel signal generation unit, the low-potential-side reference potential of the analog-to-digital converter, and the off-potential of the transfer controller may be a ground potential, at least one of the others may be a first reference potential having a potential level lower than the ground potential, and at least one of the others may be a second reference potential having a potential level higher than the ground potential.

The low-potential-side reference potentials of the photoelectric conversion unit, the pixel signal generation unit, and the analog-to-digital converter may be the ground potential, the low-potential-side reference potential of the detector may be the first reference potential, and the off-potential of the transfer controller may be the second reference potential.

The ground potential may be 0 V, the first reference potential may be a positive potential, and the second reference potential may be a negative potential.

According to the present disclosure, there is provided an imaging device including a photoelectric conversion unit including a plurality of photoelectric conversion elements each of which photoelectrically converts incident light to generate an electric signal, a detector configured to output a detection signal indicating whether or not an amount of change in the electric signal of each of the plurality of photoelectric conversion elements exceeds a predetermined threshold value, a pixel signal generation unit configured to generate a pixel signal on the basis of the electric signal, a transfer controller configured to perform control to transfer the electric signal to the pixel signal generation unit, an analog-to-digital converter configured to convert the pixel signal into a digital signal, and a potential selection unit configured to switch a low-potential-side reference potential of the photoelectric conversion unit.

The analog-to-digital converter may convert the pixel signal into the digital signal when the detector detects that the amount of change exceeds the predetermined threshold value, and the potential selection unit may select a first reference potential within a period in which the detector detects whether or not the amount of change exceeds the predetermined threshold value, and select a second reference potential having a higher potential level than that of the first reference potential within a period in which the analog-to-digital converter converts the pixel signal into the digital signal.

The first reference potential may be a negative potential, and the second reference potential may be a ground potential.

The low-potential-side reference potential of the photoelectric conversion unit, the low-potential-side reference potential of the detector, the low-potential-side reference potential of the pixel signal generation unit, the low-potential-side reference potential of the analog-to-digital converter, and the off-potential of the transfer controller may include two or more potentials having different potential levels.

The low-potential-side reference potential of the detector, the low-potential-side reference potential of the pixel signal generation unit, and the low-potential-side reference potential of the analog-to-digital converter may be the ground potentials, and the off-potential of the transfer controller may be a negative potential.

A potential generation unit configured to generate at least one of the first reference potential and the second reference potential may be included.

At least the detector may be disposed on the second substrate stacked on a first substrate on which the photoelectric conversion unit is disposed.

A back gate of a transistor in the transfer controller may be set to a potential at a same potential level as the low-potential-side reference potential of the photoelectric conversion unit.

According to another aspect of the present disclosure, there is provided an electronic apparatus including an imaging device configured to output captured image data, and a processor configured to perform predetermined signal processing to the image data, in which the imaging device includes a photoelectric conversion unit including a plurality of photoelectric conversion elements each of which photoelectrically converts incident light to generate an electric signal, a detector configured to output a detection signal indicating whether or not an amount of change in the electric signal of each of the plurality of photoelectric conversion elements exceeds a predetermined threshold value, a pixel signal generation unit configured to generate a pixel signal on the basis of the electric signal, a transfer controller configured to perform control to transfer the electric signal to the pixel signal generation unit, and an analog-to-digital converter configured to convert the pixel signal into a digital signal, in which a low-potential-side reference potential of the photoelectric conversion unit, a low-potential-side reference potential of the detector, a low-potential-side reference potential of the pixel signal generation unit, a low-potential-side reference potential of the analog-to-digital converter, and an off-potential of the transfer controller include three or more potentials having different potential levels.

According to another aspect of the present disclosure, there is provided an imaging method including a step of photoelectrically converting incident light with a plurality of photoelectric conversion elements to generate an electric signal, a step of outputting a detection signal indicating whether or not an amount of change in the electric signal of each of the plurality of photoelectric conversion elements exceeds a predetermined threshold value, a step of transferring the electric signal, a step of generating a pixel signal on the basis of the transferred electric signal, and a step of converting the pixel signal into a digital signal, in which a low-potential-side reference potential at the time of the photoelectric conversion, a low-potential-side reference potential at the time of outputting the detection signal, a low-potential-side reference potential at the time of generating the pixel signal, a low-potential-side reference potential at the time of converting the pixel signal into a digital signal, and an off-potential at the time of transferring the electric signal include three or more potentials having different potential levels, and using these potentials, the step of generating the electric signal, the step of outputting the detection signal, the step of transferring the electric signal, the step of generating the pixel signal, and the step of converting the detection signal into the digital signal are performed.

BRIEF DESCRIPTION OF DRAWINGS

FIG. 13B is a diagram illustrating an example of a potential level in a case where the transfer transistor of the first embodiment is turned on.

FIG. 14 is a diagram illustrating a low-potential-side reference potential and an off-potential used by each unit in an imaging device according to a second embodiment.

FIG. 15B is a diagram illustrating an example of a potential level in a case where the transfer transistor of the second embodiment is turned on.

MODE FOR CARRYING OUT THE INVENTION

Hereinafter, embodiments of an imaging device, an electronic apparatus, and an imaging method will be described with reference to the drawings. Although main configuration components of the imaging device and the electronic apparatus will be mainly described below, the imaging device and the electronic apparatus may have components and functions that are not illustrated or described. The following description does not exclude configuration components and functions that are not illustrated or described.

1. First Embodiment

[Configuration Example of Imaging Device]

Figure 1:
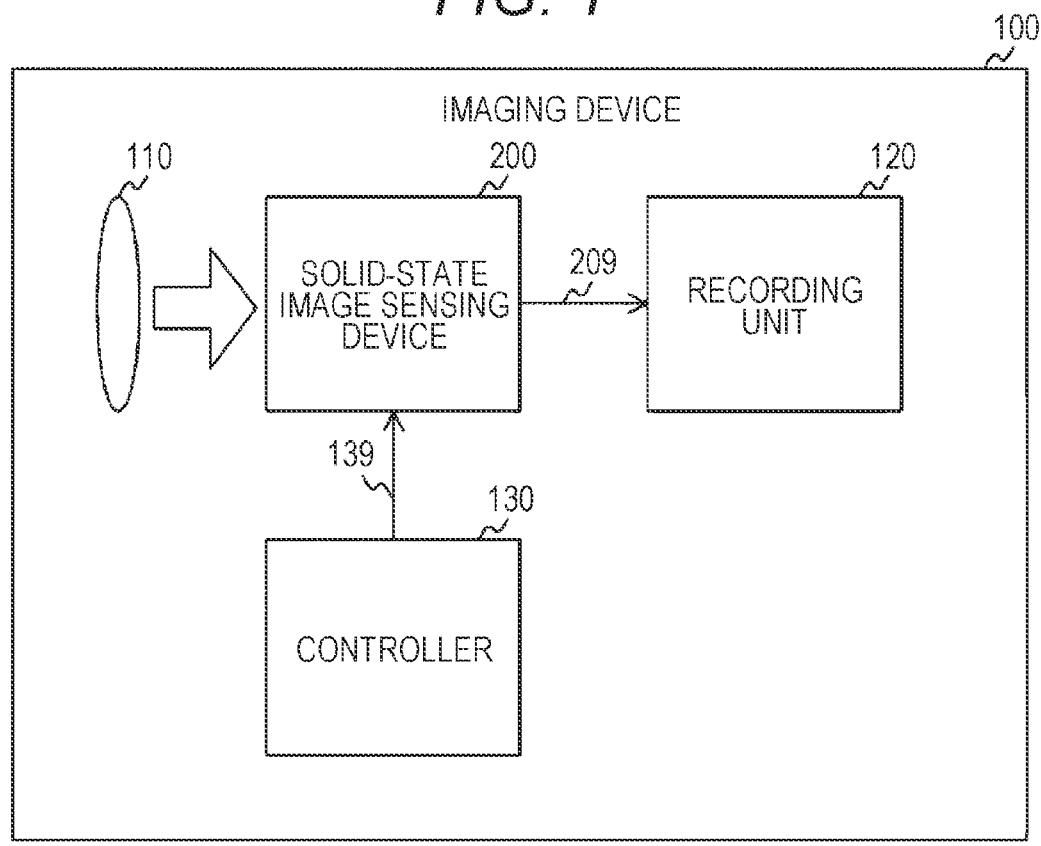
FIG. 1 is a block diagram illustrating a configuration example of an imaging device according to a first embodiment.

FIG. 1 is a block diagram illustrating a configuration example of an imaging device 100 according to a first embodiment of the present disclosure. The imaging device 100 includes an imaging lens 110, a solid-state image sensing device 200, a recording unit 120, and a controller 130. As the imaging device 100, a camera mounted on an industrial robot, an in-vehicle camera, or the like is assumed.

The imaging lens 110 condenses incident light and guides the light to the solid-state image sensing device 200. The solid-state image sensing device 200 photoelectrically converts the incident light to capture image data. The solid-state image sensing device 200 performs predetermined signal processing such as image recognition processing on the captured image data, and outputs data indicating the processing result and the detection signal of the address event to the recording unit 120 via a signal line 209. A method of generating the detection signal will be described later.

The recording unit 120 records data from the solid-state image sensing device 200. The controller 130 controls the solid-state image sensing device 200 to capture the image data.

[Configuration Example of Solid-State Image Sensing Device]

Figure 2:
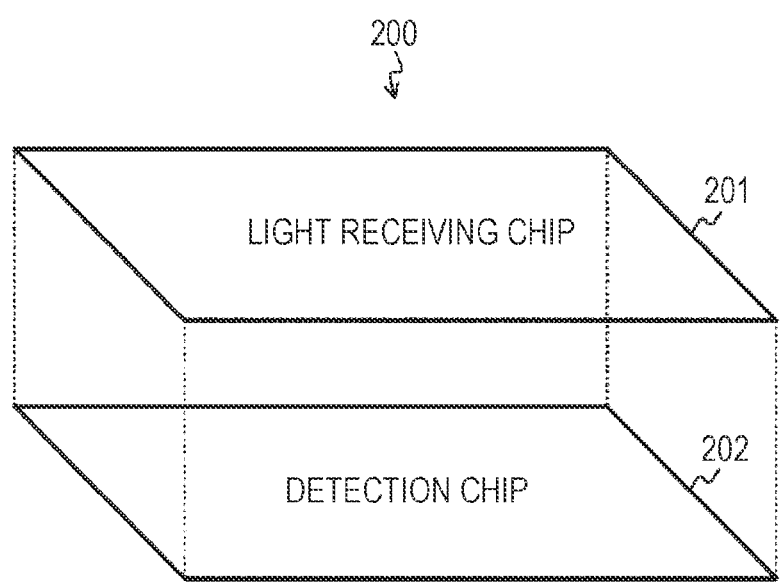
FIG. 2 is a diagram illustrating an example of a laminated structure of a solid-state image sensing device according to the first embodiment.

FIG. 2 is a diagram illustrating an example of a laminated structure of a solid-state image sensing device 200 according to the first embodiment of the present disclosure. The solid-state image sensing device 200 includes a detection chip 202 and a light receiving chip 201 stacked on the detection chip 202. These chips are electrically connected via a connection portion such as a via. Note that, in addition to the via, connection can also be made by Cu—Cu bonding or a bump.

Figure 3:
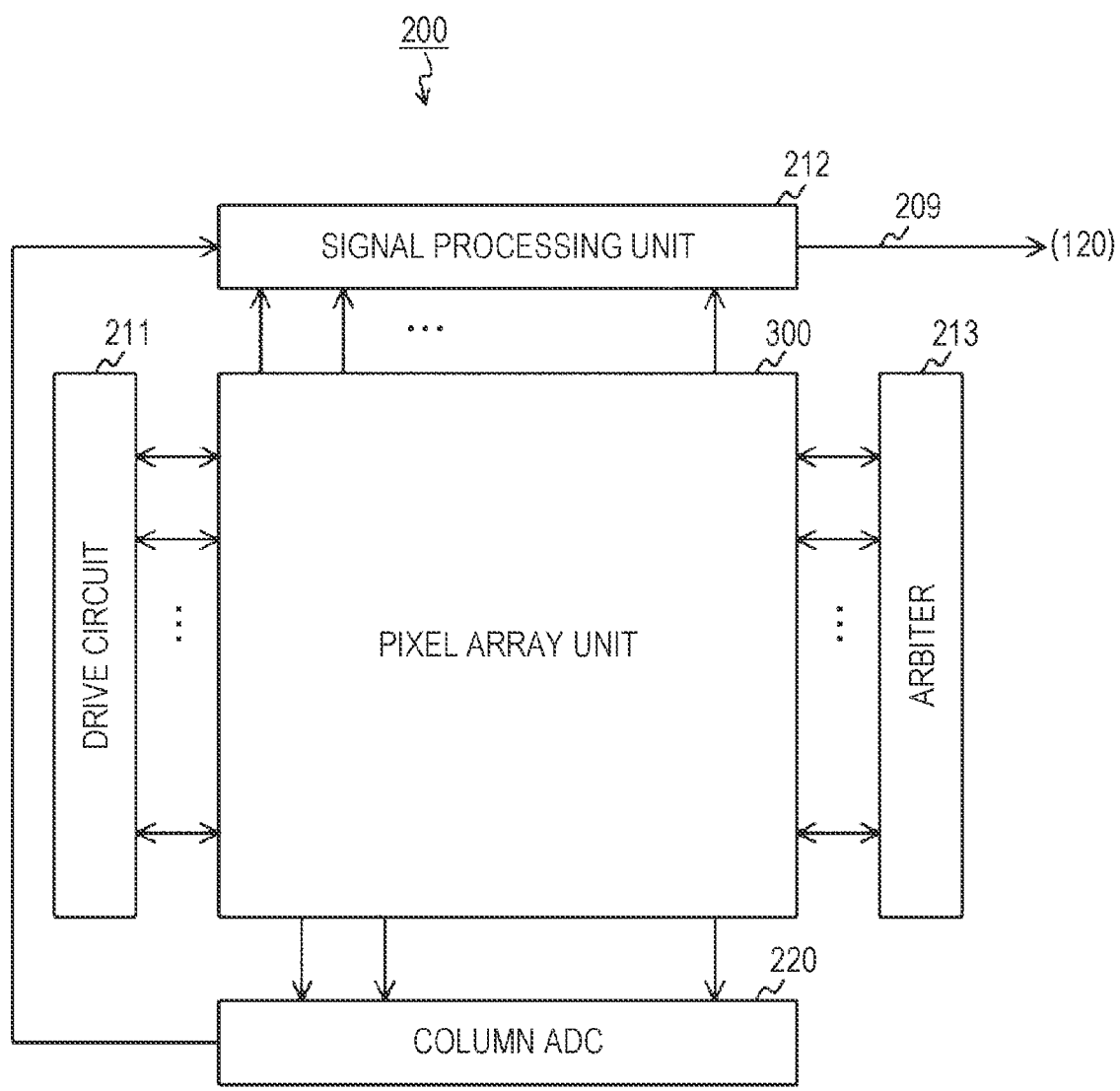
FIG. 3 is a block diagram illustrating a configuration example of the solid-state image sensing device in the first embodiment.

FIG. 3 is a block diagram illustrating a configuration example of the solid-state image sensing device 200 in the first embodiment of the present disclosure. The solid-state image sensing device 200 includes a drive circuit 211, a signal processing unit 212, an arbiter 213, a column ADC 220, and a pixel array unit 300.

In the pixel array unit 300, a plurality of pixels is arranged in a two-dimensional lattice pattern. Furthermore, the pixel array unit 300 is divided into a plurality of pixel blocks each including a predetermined number of pixels. Hereinafter, a set of pixels or pixel blocks arrayed in the horizontal direction is referred to as a "row", and a set of pixels or pixel blocks arrayed in a direction perpendicular to the row is referred to as a "column".

Each of the pixels generates an analog signal of a voltage corresponding to a photovoltaic current as a pixel signal. Furthermore, each of the pixel blocks detects the presence or absence of an address event on the basis of whether or not the amount of change in the photovoltaic current exceeds a predetermined threshold value. Then, when an address event occurs, the pixel block outputs a request to the arbiter 213.

The drive circuit 211 drives each of the pixels to output a pixel signal to the column ADC 220.

The arbiter 213 arbitrates the request from each pixel block and transmits a response to the pixel block on the basis of an arbitration result. The pixel block that has received the response supplies a detection signal indicating the detection result to the drive circuit 211 and the signal processing unit 212.

The column ADC 220 converts an analog pixel signal from the column into a digital signal for each column of the pixel block. The column ADC 220 supplies the digital signal to the signal processing unit 212.

The signal processing unit 212 performs predetermined signal processing such as correlated double sampling (CDS) processing or image recognition processing on the digital signal from the column ADC 220. The signal processing unit 212 supplies data indicating the processing result and the detection signal to the recording unit 120 via the signal line 209.

[Configuration Example of Pixel Array Unit]

Figure 4:
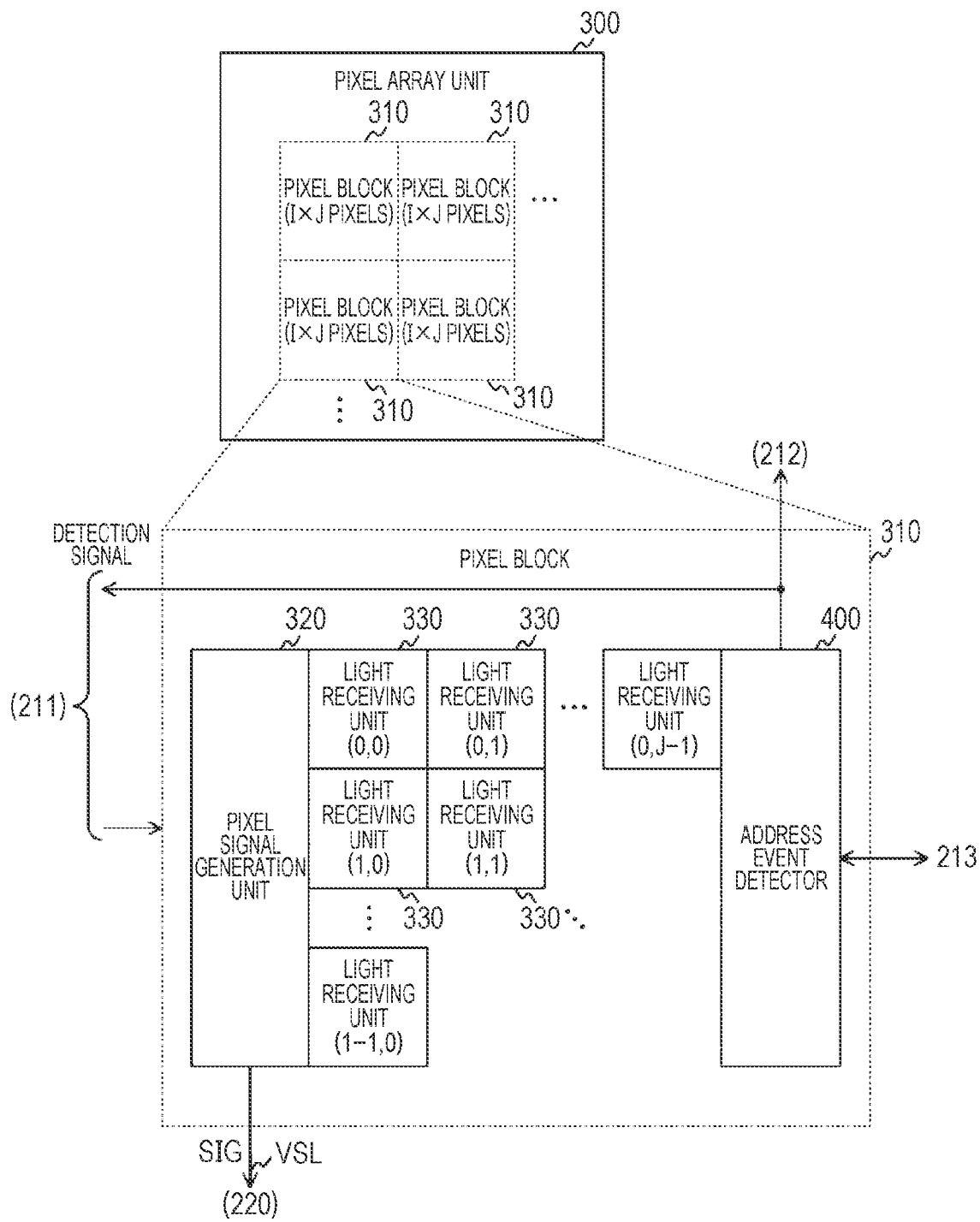
FIG. 4 is a block diagram illustrating a configuration example of a pixel array unit according to the first embodiment.

FIG. 4 is a block diagram illustrating a configuration example of a pixel array unit 300 according to the first embodiment of the present disclosure. The pixel array unit 300 is divided into a plurality of pixel blocks 310. In each of the pixel blocks 310, a plurality of pixels is arranged in I-rows×J-columns (I and J are integers).

Furthermore, the pixel block 310 includes a pixel signal generation unit 320, a plurality of light receiving units 330 of I-rows×J-columns, and an address event detector 400. The plurality of light receiving units 330 in the pixel block 310 shares the pixel signal generation unit 320 and the address event detector 400. Then, a circuit including the light receiving unit 330, the pixel signal generation unit 320, and the address event detector 400 at certain coordinates functions as a pixel at the coordinates. Furthermore, a vertical signal line VSL is wired for each column of the pixel block 310. When the number of columns of the pixel block 310 is m (m is an integer), m vertical signal lines VSL are disposed.

The light receiving unit 330 photoelectrically converts incident light to generate the photovoltaic current. The light receiving unit 330 supplies a photovoltaic current to either the pixel signal generation unit 320 or the address event detector 400 under the control of the drive circuit 211.

The pixel signal generation unit 320 generates a signal of a voltage corresponding to the photovoltaic current as the pixel signal SIG. The pixel signal generation unit 320 supplies the generated pixel signal SIG to the column ADC 220 via the vertical signal line VSL.

The address event detector 400 detects the presence or absence of an address event on the basis of whether or not the amount of change in the photovoltaic current from each of the light receiving units 330 exceeds a predetermined threshold value. The address event includes, for example, an on-event indicating that the amount of change exceeds the upper limit threshold value and an off-event indicating that the amount of change falls below the lower limit threshold value. Furthermore, the detection signal of the address event includes, for example, 1-bit indicating the detection result of the on-event and 1-bit indicating the detection result of the off-event. Note that the address event detector 400 can also detect only the on-event.

When an address event occurs, the address event detector 400 supplies a request for requesting transmission of a detection signal to the arbiter 213. Then, when a response to the request is received from the arbiter 213, the address event detector 400 supplies a detection signal to the drive circuit 211 and the signal processing unit 212. Note that the address event detector 400 is an example of a detector described in the claims.

[Configuration Example of Pixel Block]

Figure 5:
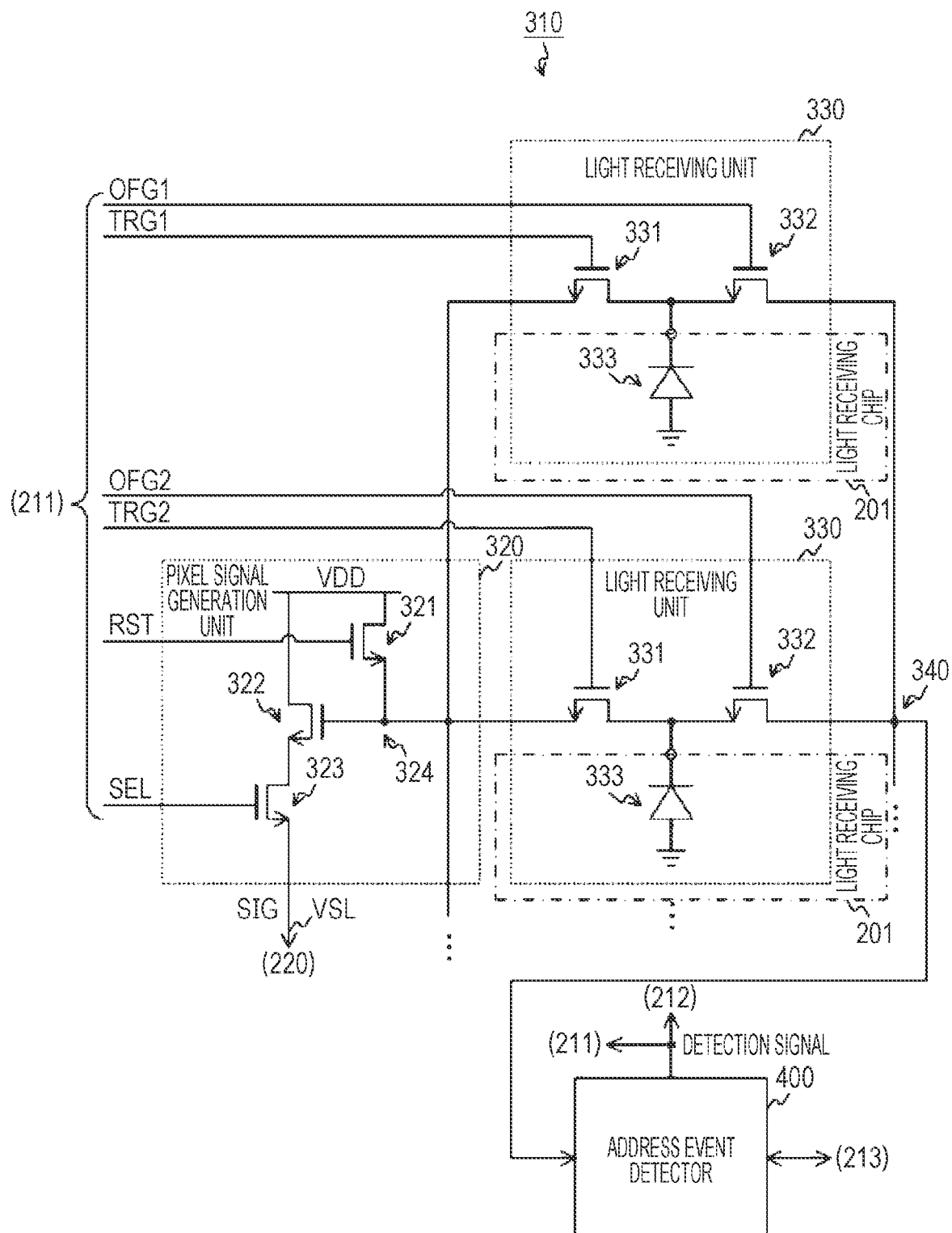
FIG. 5 is a circuit diagram illustrating a configuration example of a pixel block according to the first embodiment.

FIG. 5 is a circuit diagram illustrating a configuration example of the pixel block 310 according to the first embodiment of the present disclosure. In the pixel block 310, the pixel signal generation unit 320 includes a reset transistor 321, an amplification transistor 322, a selection transistor 323, and a floating diffusion layer 324. The plurality of light receiving units 330 in the pixel block 310 is commonly connected to the address event detector 400 via a connection node 340.

Furthermore, each of the light receiving units 330 includes a transfer transistor 331, an over flow gate (OFG) transistor 332, and a photoelectric conversion element 333. Assuming that the number of pixels in the pixel block 310 is N (N is an integer), N transfer transistors 331, N OFG transistors 332, and N photoelectric conversion elements 333 are disposed. A transfer signal TRGn is supplied to the gate of the n-th (n is an integer from 1 to N) transfer transistor 331 in the pixel block 310 by the drive circuit 211. A control signal OFGn is supplied to the gate of the n-th OFG transistor 332 by the drive circuit 211. In the present specification, the transfer transistor 331 and the OFG transistor 332 are collectively referred to as a transfer controller 335, and the photoelectric conversion element is referred to as a photoelectric conversion unit 334.

Furthermore, for example, an N-type metal-oxide-semiconductor (MOS) transistor is used as the reset transistor 321, the amplification transistor 322, and the selection transistor 323. Similarly, an N-type MOS transistor is used for the transfer transistor 331 and the OFG transistor 332.

Furthermore, each of the photoelectric conversion elements 333 is disposed on the light receiving chip 201. All the elements other than the photoelectric conversion element 333 are disposed on the detection chip 202. Note that a modification example in which a part of elements other than the photoelectric conversion element 333 is disposed on the light receiving chip 201 is also conceivable.

The photoelectric conversion element 333 photoelectrically converts the incident light to generate a charge. The transfer transistor 331 transfers a charge from the corresponding photoelectric conversion element 333 to the floating diffusion layer 324 according to the transfer signal TRGn. The OFG transistor 332 supplies an electric signal generated by the corresponding photoelectric conversion element 333 to the connection node 340 according to the control signal OFGn. Here, the supplied electric signal is a photovoltaic current including charges.

The floating diffusion layer 324 accumulates charge and generates a voltage corresponding to the amount of accumulated charge. The reset transistor 321 initializes the charge amount of the floating diffusion layer 324 according to a reset signal from the drive circuit 211. The amplification transistor 322 amplifies the voltage of the floating diffusion layer 324. The selection transistor 323 outputs an amplified voltage signal as a pixel signal SIG to the column ADC 220 via the vertical signal line VSL according to a selection signal SEL from the drive circuit 211.

When the controller 130 instructs to start detecting an address event, the drive circuit 211 drives the OFG transistors 332 of all the pixels by the control signal OFGn to supply the photovoltaic current to the connection node 340. Therefore, the current of the sum of the photovoltaic current of all the light receiving units 330 in the pixel block 310 is supplied to the address event detector 400.

Then, when an address event is detected in a certain pixel block 310, the drive circuit 211 turns off all the OFG transistors 332 of the block and stops supplying the photovoltaic current to the address event detector 400. Next, the drive circuit 211 sequentially drives each transfer transistor 331 by the transfer signal TRGn to transfer the charge to the floating diffusion layer 324. Therefore, the pixel signal of each of the plurality of pixels in the pixel block 310 is sequentially output.

In this manner, the solid-state image sensing device 200 outputs only the pixel signal of the pixel block 310 in which the address event has been detected to the column ADC 220. Therefore, regardless of the presence or absence of the address event, the power consumption of the solid-state image sensing device 200 and the processing amount of image processing can be reduced as compared with the case of outputting the pixel signals of all the pixels.

Furthermore, since the plurality of pixels shares the address event detector 400, the circuit scale of the solid-state image sensing device 200 can be reduced as compared with a case where the address event detector 400 is disposed for each pixel.

[Configuration Example of Address Event Detector 400]

Figure 6:
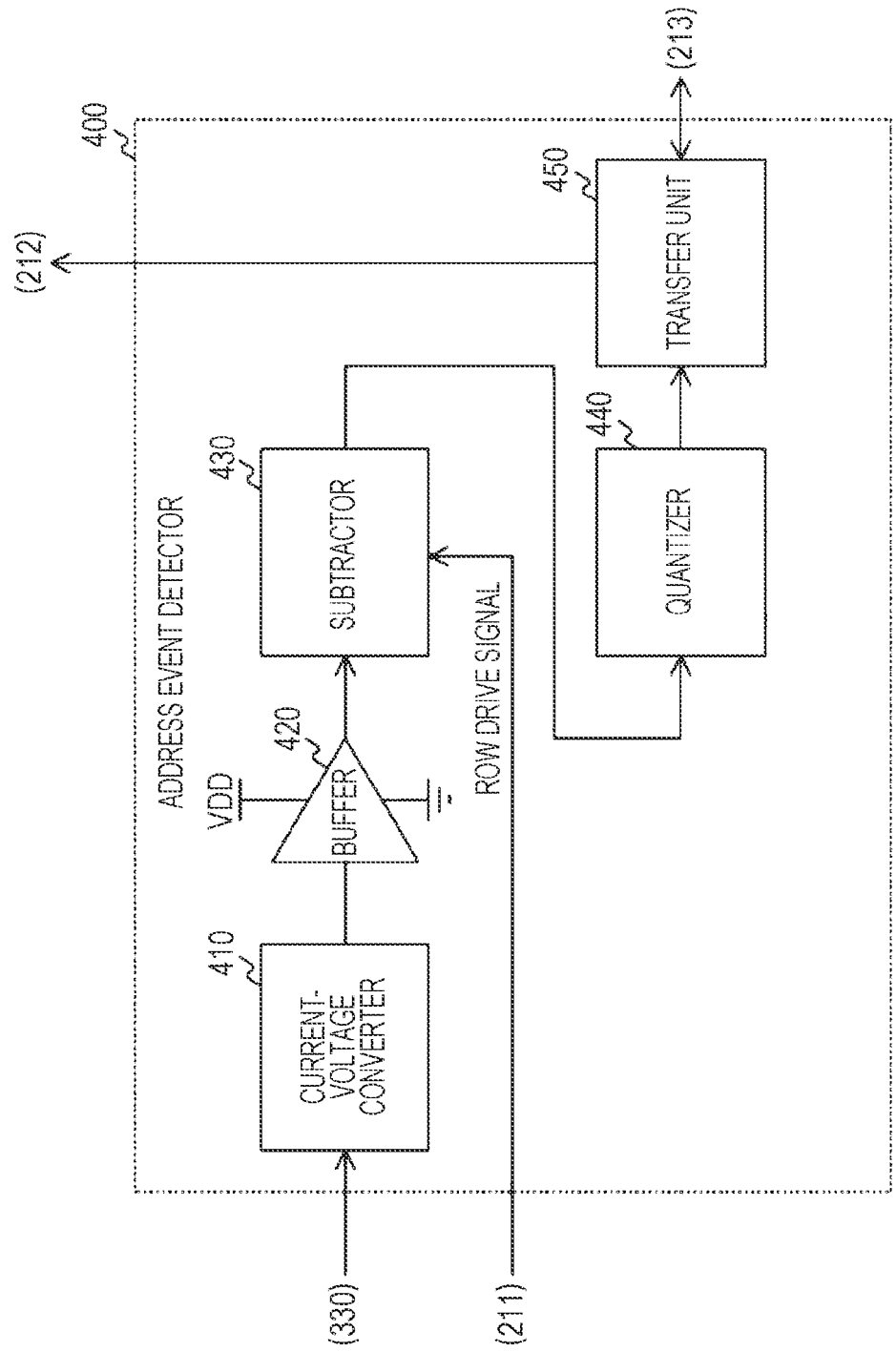
FIG. 6 is a block diagram illustrating a first configuration example of an address event detector.

FIG. 6 is a block diagram illustrating a first configuration example of the address event detector 400 according to the first embodiment of the present disclosure. The address event detector 400 includes a current-voltage converter 410, a buffer 420, a subtractor 430, a quantizer 440, and a transfer unit 450.

The current-voltage converter 410 converts the photovoltaic current from the corresponding light receiving unit 330 into a logarithmic voltage signal. The current-voltage converter 410 supplies the voltage signal to the buffer 420.

The buffer 420 corrects the voltage signal from the current-voltage converter 410. The buffer 420 outputs the corrected voltage signal to the subtractor 430.

The subtractor 430 lowers the level of the voltage signal from the buffer 420 in accordance with the row drive signal from the drive circuit 211. The subtractor 430 supplies the reduced voltage signal to the quantizer 440.

The quantizer 440 quantizes the voltage signal from the subtractor 430 into a digital signal and outputs the digital signal to the transfer unit 450 as a detection signal.

The transfer unit 450 transfers the detection signal from the quantizer 440 to the signal processing unit 212 and the like. When an address event is detected, the transfer unit 450 supplies a request for requesting transmission of a detection signal to the arbiter 213. Then, when the response to the request is received from the arbiter 213, the transfer unit 450 supplies the detection signal to the drive circuit 211 and the signal processing unit 212.

[Configuration Example of Current-Voltage Converter]

Figure 7:
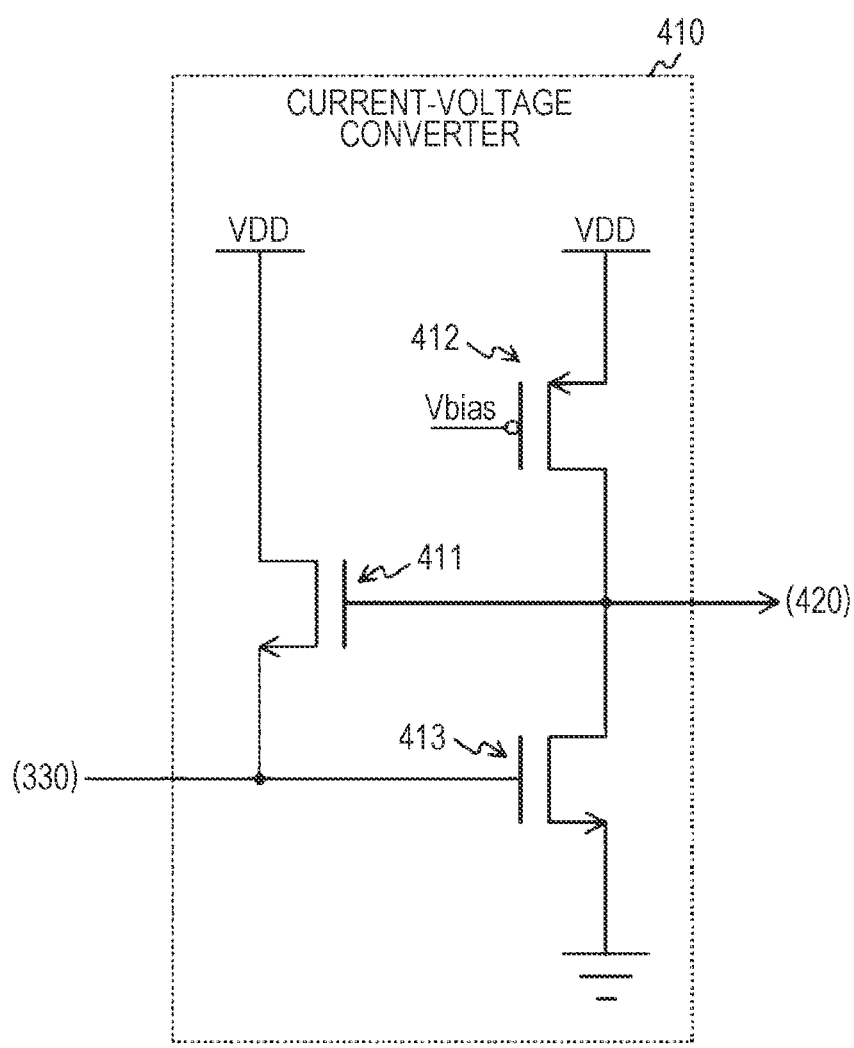
FIG. 7 is a circuit diagram illustrating a configuration example of a current-voltage converter according to the first embodiment.

FIG. 7 is a circuit diagram illustrating a configuration example of the current-voltage converter 410 according to the first embodiment of the present disclosure. The current-voltage converter 410 includes N-type transistors 411 and 413 and a P-type transistor 412. As these transistors, for example, MOS transistors are used.

A source of the N-type transistor 411 is connected to the light receiving unit 330, and a drain thereof is connected to a power supply terminal. The P-type transistor 412 and the N-type transistor 413 are connected in series between the power supply terminal and the ground terminal. Furthermore, the connection node of the P-type transistor 412 and the N-type transistor 413 is connected to the gate of the N-type transistor 411 and the input terminal of the buffer 420. Furthermore, a predetermined bias voltage Vbias is applied to the gate of the P-type transistor 412.

Drains of the N-type transistors 411 and 413 are connected to a power supply side, and such a circuit is called a source follower. The photovoltaic current from the light receiving unit 330 is converted into the logarithmic voltage signal by the two source followers connected in the loop shape. Furthermore, the P-type transistor 412 supplies a constant current to the N-type transistor 413.

[Configuration Examples of Subtractor and Quantizer]

Figure 8:
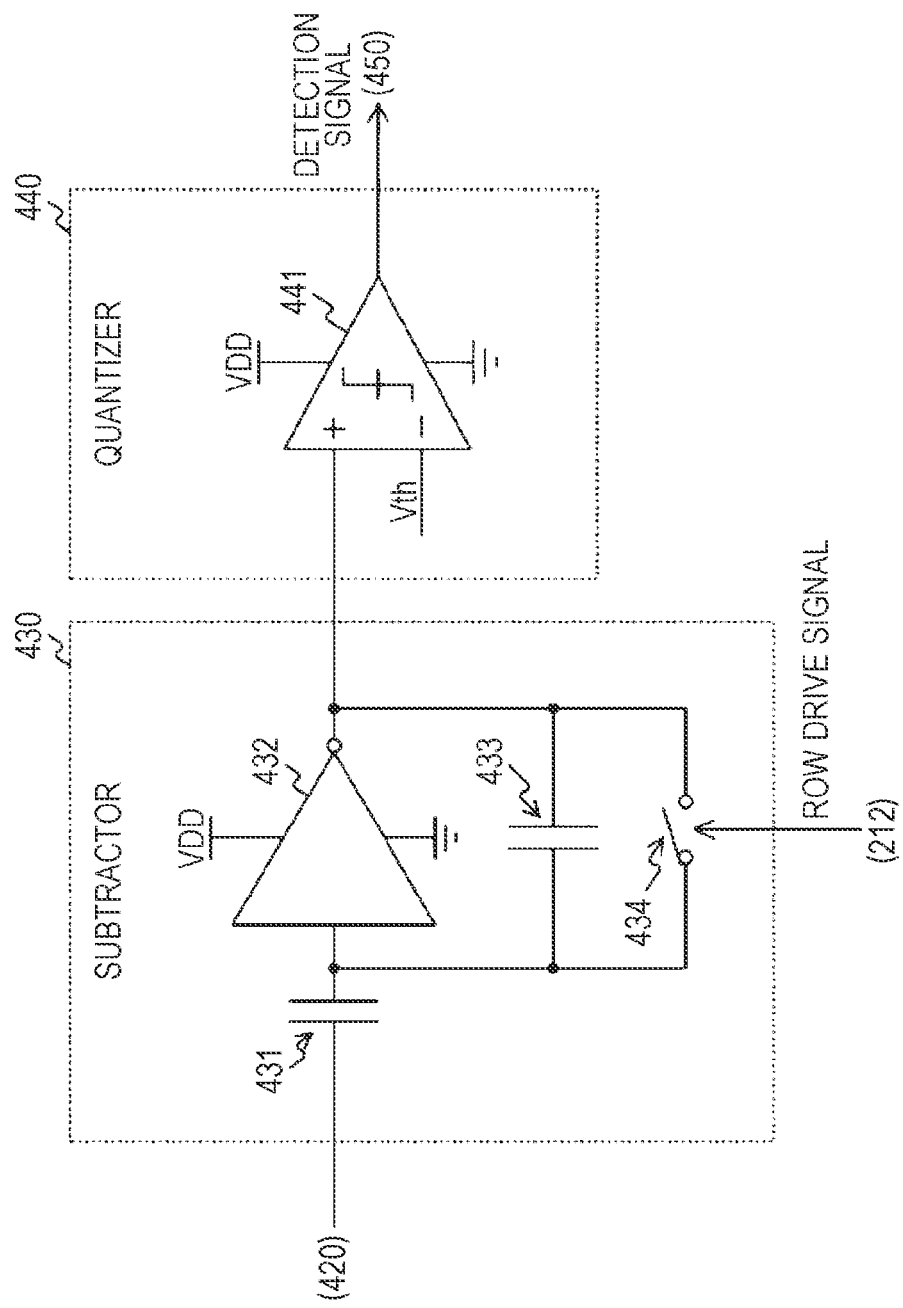
FIG. 8 is a circuit diagram illustrating a configuration example of a subtractor and a quantizer according to the first embodiment.

FIG. 8 is a circuit diagram illustrating a configuration example of the subtractor 430 and the quantizer 440 according to the first embodiment of the present disclosure. The subtractor 430 includes capacitors 431 and 433, an inverter 432, and a switch 434. Furthermore, the quantizer 440 includes a comparator 441.

One end of the capacitor 431 is connected to the output terminal of the buffer 420, and the other end is connected to the input terminal of the inverter 432. The capacitor 433 is connected in parallel to the inverter 432. The switch 434 opens and closes a path connecting both ends of the capacitor 433 according to the row drive signal.

The inverter 432 inverts a voltage signal input via the capacitor 431. The inverter 432 outputs the inverted signal to a non-inverting input terminal (+) of the comparator 441.

When the switch 434 is turned on, a voltage signal Vinit is input to the buffer 420 side of the capacitor 431, and the opposite side becomes a virtual ground terminal. The potential of the virtual ground terminal is set to zero for convenience. At this time, a potential Qinit accumulated in the capacitor 431 is expressed by the following equation, where the capacitance of the capacitor 431 is C1. On the other hand, since both ends of the capacitor 433 are short-circuited, the accumulated charge becomes zero.

$$Q\text{init} = C1 \times V\text{init} \quad (1)$$

Next, considering a case where the switch 434 is turned off and the voltage on the buffer 420 side of the capacitor 431 changes to Vafter, a charge Qafter accumulated in the capacitor 431 is expressed by the following equation.

$$Q\text{after} = C1 \times V\text{after} \quad (2)$$

On the other hand, when the output voltage is Vout, a charge Q2 accumulated in the capacitor 433 is expressed by the following equation.

$$Q2 = -C2 \times V\text{out} \quad (3)$$

At this time, since the total charge amounts of the capacitors 431 and 433 do not change, the following equation holds.

$$Q\text{init} = Q\text{after} + Q2 \quad (4)$$

When Equations (1) to (3) are substituted into Equation (4) and deformed, the following equation is obtained.

$$V\text{out} = -(C1/C2) \times (V\text{after} - V\text{init}) \quad (5)$$

Equation (5) represents the subtraction operation of the voltage signal, and the gain of the subtraction result is C1/C2. Normally, since it is desired to maximize the gain, it is preferable to design the capacitance C1 of the capacitor 431 to be large and the capacitance C2 of the capacitor 433 to be small. On the other hand, when C2 is too small, kTC noise increases, and noise characteristics may deteriorate. Therefore, capacity reduction of C2 is limited to a range in which noise can be tolerated. Furthermore, since the address event detector 400 including the subtractor 430 is mounted for each pixel block, the capacitances C1 and C2 have area restrictions. In consideration of these, the values of the capacitances C1 and C2 are determined.

The comparator 441 compares the voltage signal from the subtractor 430 with a predetermined threshold value voltage Vth applied to an inverting input terminal (−) The comparator 441 outputs a signal indicating the comparison result to the transfer unit 450 as a detection signal.

Furthermore, when the conversion gain of the current-voltage converter 410 is CGlog and the gain of the buffer 420 is "1", a gain A of the entire address event detector 400 is expressed by the following equation.

[Formula 1]

$$A = \frac{CG_{log} \cdot C1}{C2} \sum_{n=1}^{N} i_{photo\_n} \qquad (6)$$

In the above equation, iphoto_n is the photovoltaic current of the n-th pixel, and the unit is, for example, ampere (A). N is the number of pixels in the pixel block 310.

[Configuration Example of Column ADC 220]

Figure 9:
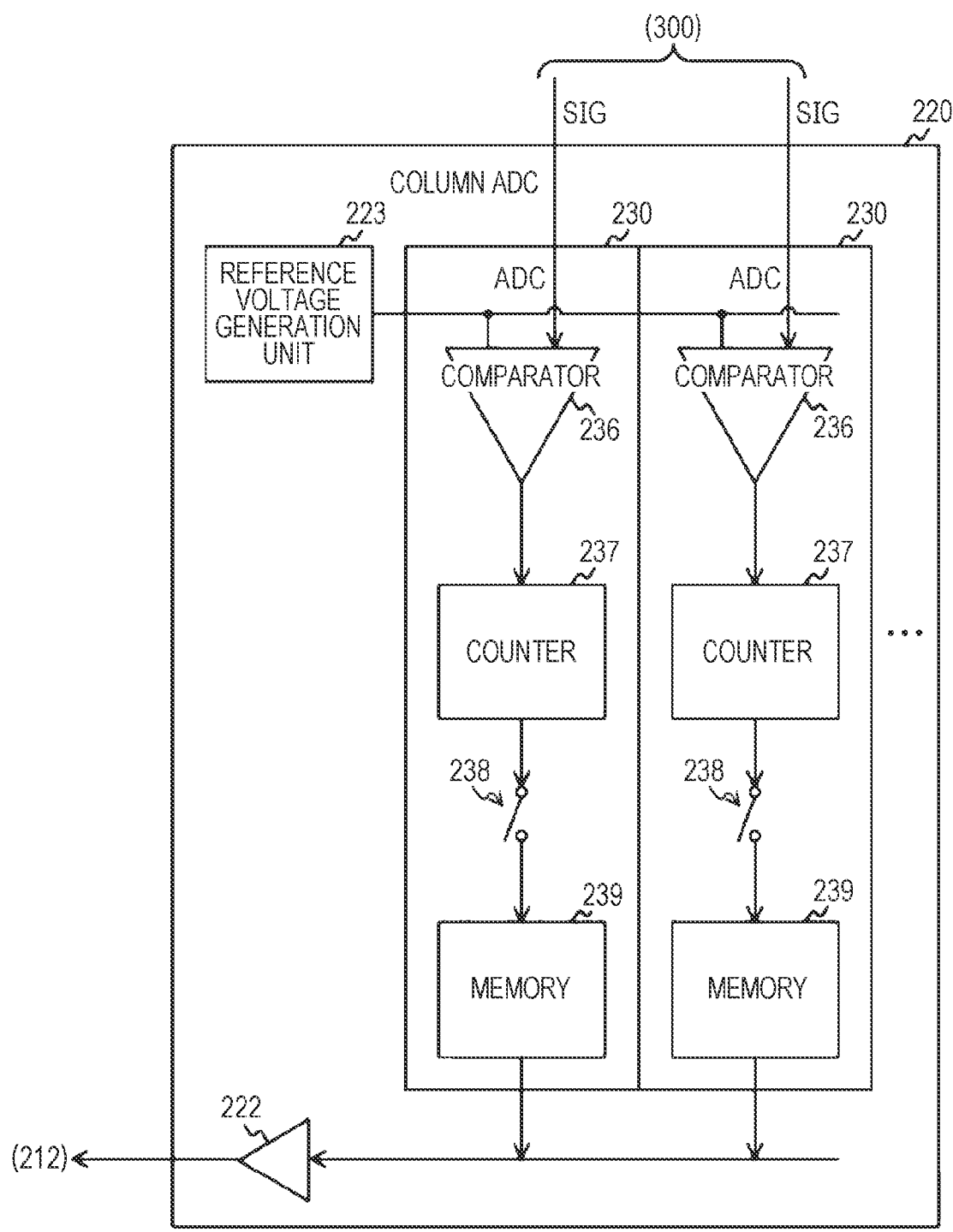
FIG. 9 is a block diagram illustrating a configuration example of a column ADC according to the first embodiment.

FIG. 9 is a block diagram illustrating a configuration example of the column ADC 220 according to the first embodiment of the present disclosure. The column ADC 220 includes an ADC 230 for each column of the pixel blocks 310. Furthermore, the column ADC 220 includes a reference signal generation unit 223 and an output unit 222. The reference signal generation unit 223 generates a reference signal such as a ramp signal and supplies the reference signal to each of the ADCs 230. A digital-to-analog converter (DAC) or the like is used as the reference signal generation unit 223. The output unit 222 supplies the digital signal from the ADC 230 to the signal processing unit 212.

The ADC 230 converts the analog pixel signal SIG supplied via the vertical signal line VSL into a digital signal. The ADC 230 includes a comparator 236, a counter 237, a switch 238, and a memory 239. The comparator 236 compares the reference signal with the pixel signal SIG, and the counter 237 counts the count value over a period until the comparison result is inverted. The switch 238 supplies and holds the count value in the memory 239 under the control of a timing control circuit (not illustrated) or the like. The memory 239 supplies a digital signal indicating the count value to the output unit 222 under the control of a horizontal drive unit (not illustrated) or the like. With this configuration, the pixel signal SIG is converted into a digital signal having a larger bit depth than the detection signal. For example, when the detection signal is 2-bits, the pixel signal is converted into a digital signal of 3-bits or more (16 bits or the like). Note that the ADC 230 is an example of an analog-to-digital converter described in the claims.

[Operation Example of Solid-State Image Sensing Device]

Figure 10:
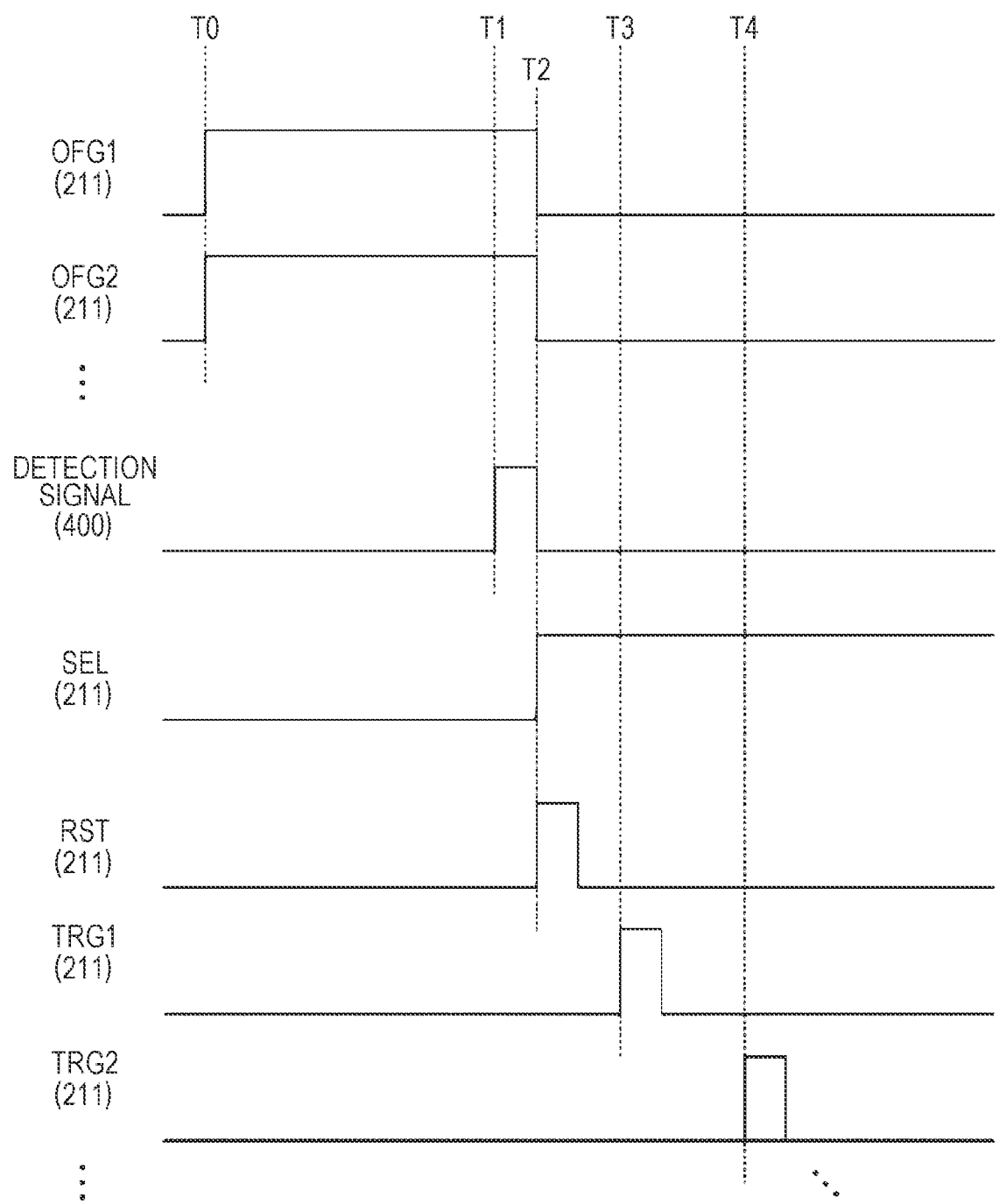
FIG. 10 is a timing chart illustrating an example of operation of the solid-state image sensing device according to the first embodiment.

FIG. 10 is a timing chart illustrating an example of operation of the solid-state image sensing device 200 according to the first embodiment of the present disclosure. At timing T0, when the controller 130 issues an instruction to start detection of an address event, the drive circuit 211 sets all the control signals OFGn to the high level and turns on the OFG transistors 332 of all the pixels. Therefore, the sum of the photovoltaic currents of all the pixels is supplied to the address event detector 400. On the other hand, the transfer signals TRGn are all at a low level, and the transfer transistors 331 of all the pixels are in an off state.

Then, it is assumed that the address event detector 400 detects an address event and outputs a high-level detection signal at timing T1. Here, the detection signal is assumed to be a 1-bit signal indicating the detection result of the on-event.

When the detection signal is received, the drive circuit 211 sets all the control signals OFGn to the low level at timing T2 to stop the supply of the photovoltaic current to the address event detector 400. Furthermore, the drive circuit 211 sets the selection signal SEL to the high level and sets a reset signal RST to the high level over a certain pulse period to initialize the floating diffusion layer 324. The pixel signal generation unit 320 outputs the voltage at the time of initialization as a reset level, and the ADC 230 converts the reset level into a digital signal.

At timing T3 after the conversion of the reset level, the drive circuit 211 supplies the high-level transfer signal TRG1 over a certain pulse period, and causes the first pixel to output a voltage as a signal level. The ADC 230 converts the signal level into a digital signal. The signal processing unit 212 obtains a difference between the reset level and the signal level as a net pixel signal. This processing is called CDS processing.

At timing T4 after the conversion of the signal level, the drive circuit 211 supplies the high-level transfer signal TRG2 over a certain pulse period, and causes the second pixel to output the signal level. The signal processing unit 212 obtains a difference between the reset level and the signal level as a net pixel signal. Thereafter, similar processing is executed, and the pixel signals of the respective pixels in the pixel block 310 are sequentially output.

When all the pixel signals are output, the drive circuit 211 sets all the control signals OFGn to the high level and turns on the OFG transistors 332 of all the pixels.

Figure 11:
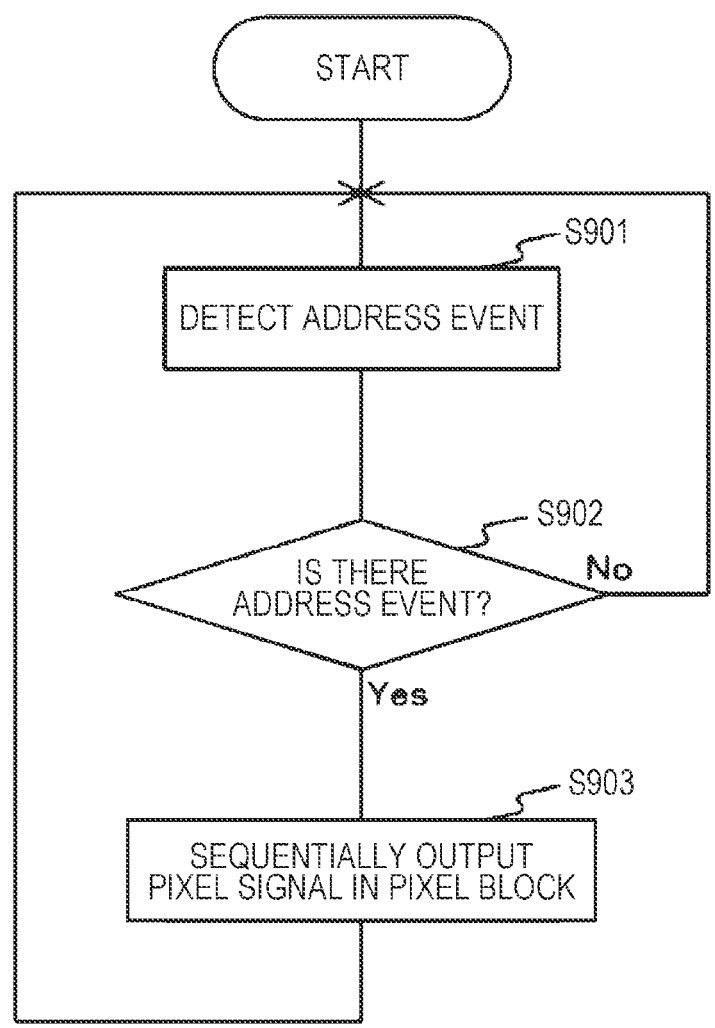
FIG. 11 is a flowchart illustrating an example of operation of the solid-state image sensing device according to the first embodiment.

FIG. 11 is a flowchart illustrating an example of the operation of the solid-state image sensing device 200 according to the first embodiment of the present disclosure. This operation is started, for example, when a predetermined application for detecting an address event is executed.

Each of the pixel blocks 310 detects the presence or absence of an address event (step S901). The drive circuit 211 determines whether or not there is an address event in any pixel block 310 (step S902). In a case where there is an address event (step S902: Yes), the drive circuit 211 sequentially outputs the pixel signal of each pixel in the pixel block 310 in which the address event has occurred (step S903).

In a case where there is no address event (step S902: No), or after step S903, the solid-state image sensing device 200 repeats step S901 and the subsequent steps.

As described above, according to the first embodiment of the present disclosure, since the address event detector 400 detects the amount of change in the photovoltaic current of each of the plurality (N) of photoelectric conversion elements 333 (pixels), the number of the arranged address event detectors 400 can be one for every N pixels. As the N pixels share one address event detector 400 in this manner, the circuit scale can be reduced as compared with a configuration in which the address event detector 400 is not shared and is provided for each pixel.

Note that the value of N described above is arbitrary. For example, in a case where it is not necessary to consider reduction in the circuit scale, the address event detector 400 may be provided for each pixel with N=1.

In the first embodiment, the low-potential-side reference potential and the off-potential used by each unit in the imaging device 100 include three or more types of potentials having different potential levels. The low-potential-side reference potential and the off-potential are typically the ground potential GND, but in the present embodiment, it is assumed that a potential at a potential level other than the ground potential GND is used by each unit in the imaging device 100.

More specifically, the low-potential-side reference potential of the photoelectric conversion unit 334, the low-potential-side reference potential of the detector, the low-potential-side reference potential of the pixel signal generation unit 320, the low-potential-side reference potential of the column ADC 220, and the off-potential of the transfer controller 335 include three or more potentials having different potential levels.

For example, the potential level of the low-potential-side reference potential of the photoelectric conversion unit 334 may be lower than the potential level of the low-potential-side reference potential of the address event detector 400. Furthermore, the potential level of the low-potential-side reference potential of the photoelectric conversion unit 334 may be higher than that of the off-potential of the transfer controller 335. Furthermore, the potential level of the low-potential-side reference potential of the photoelectric conversion unit 334 may be lower than that of the low-potential-side reference potential of at least one of the pixel signal generation unit 320 and the column ADC 220.

Figure 12:
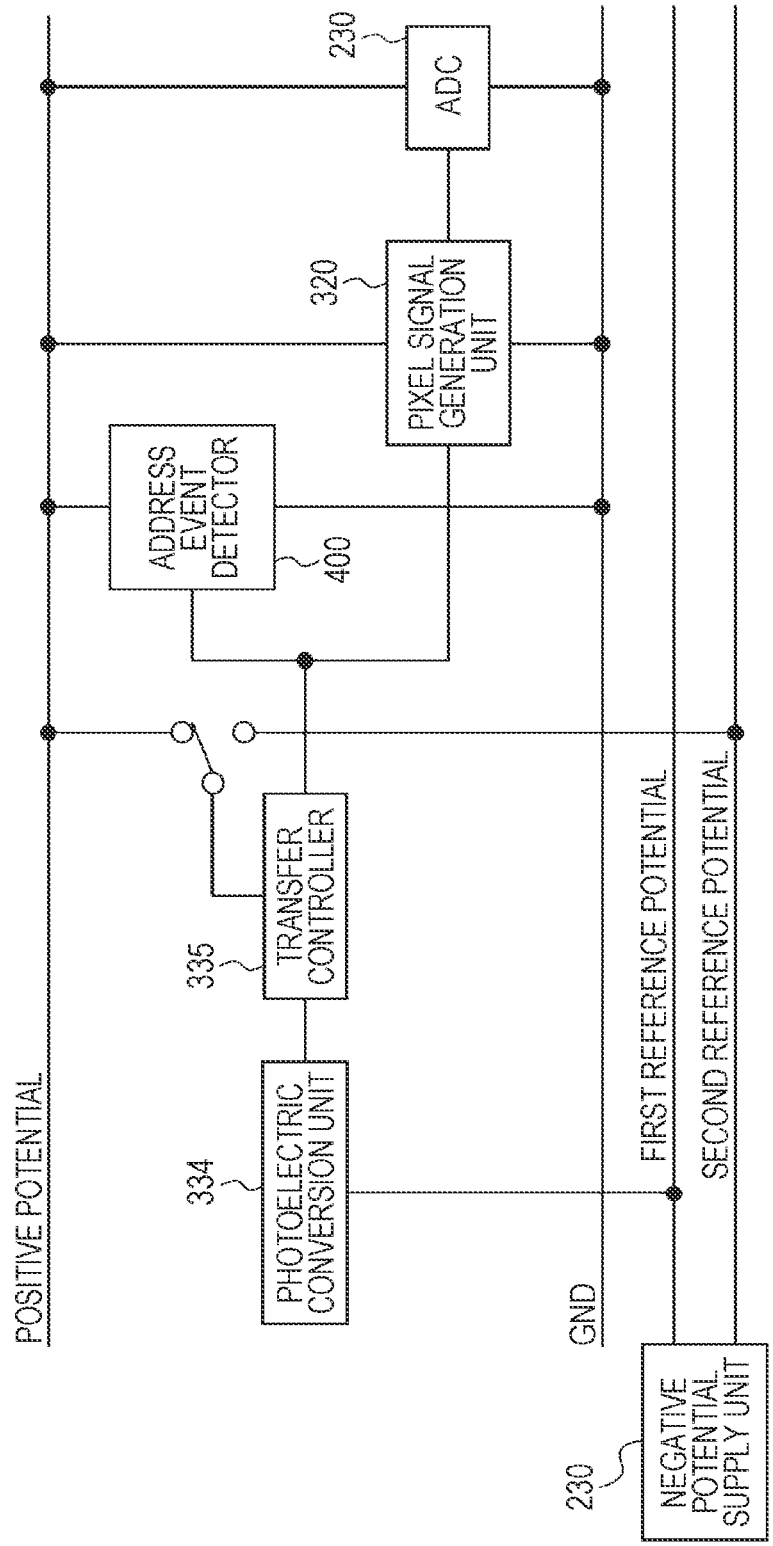
FIG. 12 is a diagram illustrating a low-potential-side reference potential and an off-potential used by each unit in the imaging device according to the first embodiment.

FIG. 12 is a diagram illustrating the low-potential-side reference potential and the off-potential used by each unit in the imaging device 100 according to the first embodiment. FIG. 12 illustrates an example in which the low-potential-side reference potential and the off-potential used by each unit in the imaging device 100 include three potentials having different potential levels. In the example of FIG. 12, these three potentials are set as the ground potential, the first reference potential, and the second reference potential. The ground potential is, for example, 0 V, the first reference potential is a negative potential having a potential level lower than that of the ground potential GND, and the second reference potential is a negative potential having a potential level lower than that of the second reference potential.

The first reference potential and the second reference potential are supplied from the negative potential supply unit 235. The negative potential supply unit 235 generates a first reference potential and a second reference potential lower than the ground potential GND using, for example, a charge pump.

In the example of FIG. 12, the low-potential-side reference potential of the photoelectric conversion unit 334 is the first reference potential. Furthermore, the low-potential-side reference potentials of the address event detector 400, the pixel signal generation unit 320, and the column ADC 220 are the ground potential GND. The off-potential of the transfer controller 335 is the second reference potential. The transfer controller 335 includes the transfer transistor 331 and the OFG transistor 332, and the off-potential of the transfer controller 335 refers to a potential for turning off the gates of the transfer transistor 331 and the OFG transistor 332.

In FIG. 12, by setting the low-potential-side reference potential of the photoelectric conversion unit 334 to the second reference potential that is a negative potential, the reverse bias of the photodiode (the photoelectric conversion element) in the photoelectric conversion unit 334 increases as compared with the case where the low-potential-side reference potential of the photoelectric conversion unit 334 is set to the ground potential GND. Therefore, the sensitivity of the photodiode 311 increases, and the dark current can be reduced.

Furthermore, the back gates of the transfer transistor 331 and the OFG transistor 332 in the transfer controller 335 may be set to the negative potential Vn. Therefore, it is possible to prevent the threshold value voltage of each transistor from becoming high and the gate-source voltage of each transistor from becoming zero or less due to the substrate bias effect as compared with the case where the potentials are set to the reference potential. When the gate-source voltage becomes zero or less, a normal output cannot be obtained due to the circuit configuration of the pixel signal generation unit 320. Therefore, such a situation can be suppressed by supplying the negative potential Vn to the back gate. As described above, the signal quality of the detection signal can be improved by improving the sensitivity of the photodiode 311, decreasing the dark current, and increasing the threshold value voltage.

In FIG. 12, the low-potential-side reference potential (the first reference potential) of the address event detector 400 is set to a potential level higher than the low-potential-side reference potential (the first reference potential) of the photoelectric conversion unit 334. If the low-potential-side reference potential of the address event detector 400 is set to be lower than the low-potential-side reference potential of the photoelectric conversion unit 334, a sufficient reverse bias is not applied to the photodiode in the photoelectric conversion unit 334, and there is a possibility that a response is delayed due to an increase in leakage current or an increase in noise. As illustrated in FIG. 12, by setting the low-potential-side reference potential of the address event detector 400 to a potential level higher than the low-potential-side reference potential of the photoelectric conversion unit 334, a sufficient reverse bias can be applied to the photodiode, and noise can be reduced and a response speed can be improved.

The OFG transistor 332 in the transfer controller 335 is turned on in a case where the address event detector 400 performs the address event detection process. At this time, the transfer transistor 331 needs to be turned off. Furthermore, when the address event is detected by the address event detector 400, the OFG transistor 332 is turned off, and the transfer transistor 331 is turned on. When the transfer transistor 331 is turned on, an electric signal (the photovoltaic current) photoelectrically converted by the photodiode is sent to the pixel signal generation unit 320 via the transfer transistor 331 to generate a pixel signal, and then sent to the column ADC 220 to generate a digital signal.

In this manner, the OFG transistor 332 and the transfer transistor 331 are exclusively turned on/off. In order to reliably cause the OFG transistor 332 and the transfer transistor 331 to perform the exclusive operation, it is desirable to apply a positive potential to the gate of the transistor to be turned on and a negative potential to the gate of the transistor to be turned off. Therefore, in FIG. 12, the off-potential of the transfer controller 335 is set to the second reference potential which is a negative potential.

Figure 13A:
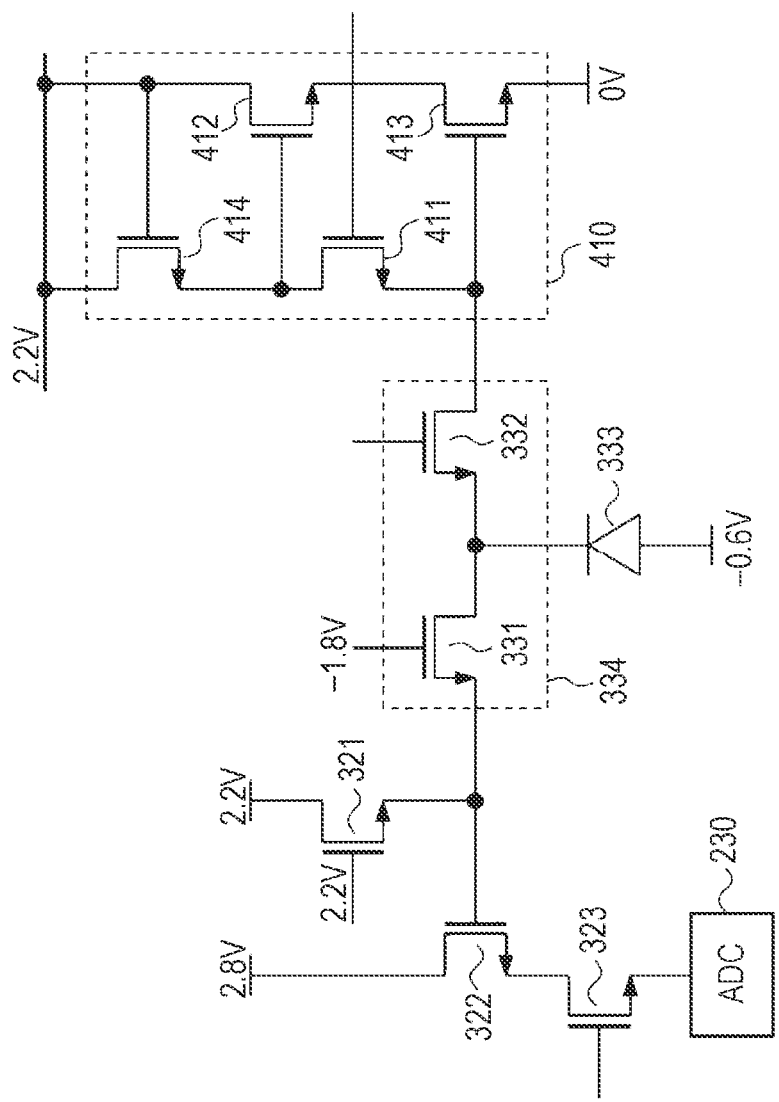
FIG. 13A is a diagram illustrating an example of a potential level in a case where a transfer transistor of the first embodiment is turned off.
Figure 13B:
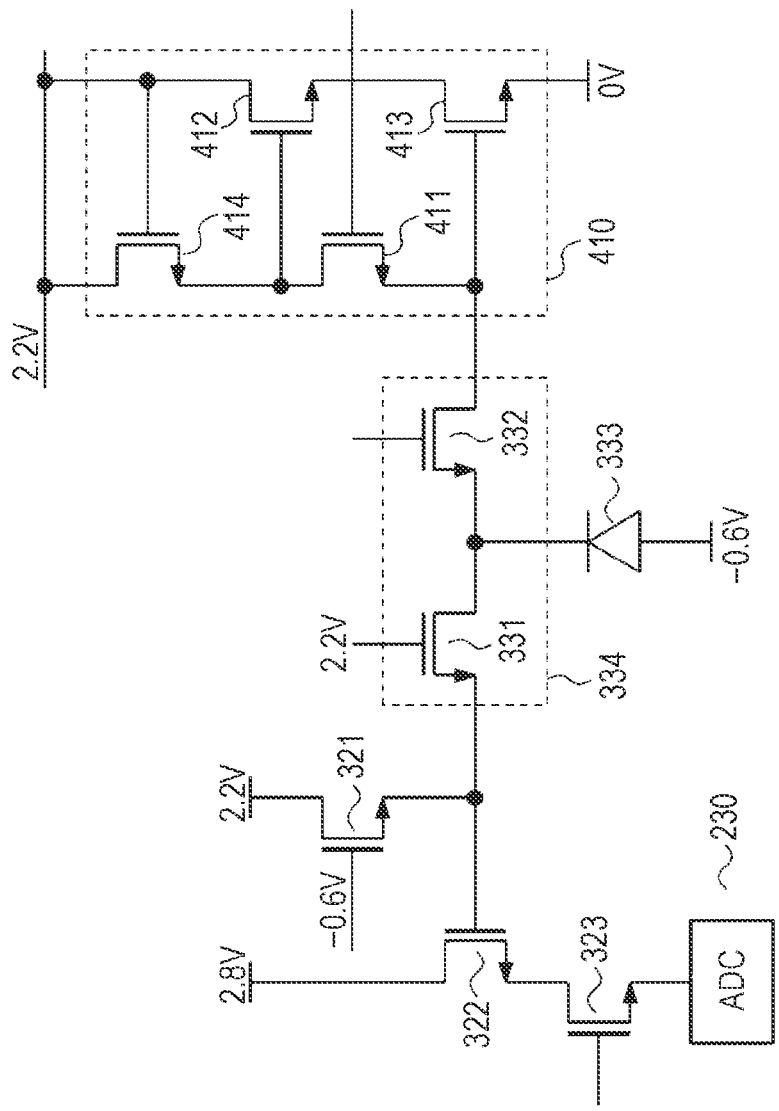

FIGS. 13A and 13B are examples of specific potential levels of the low-potential-side reference potential and the off-potential provided to each unit in the imaging device 100 according to the first embodiment. FIG. 13A illustrates the potential level in a case where the transfer transistor is turned off, and FIG. 13B illustrates the potential level in a case where the transfer transistor is turned on. In a case where the address event detection is performed, the potential level is set to the potential level in FIG. 13A. Note that the potential levels in FIGS. 13A and 13B are examples, and various modification examples are conceivable.

As illustrated in FIG. 13A, in a case where the transfer transistor is turned off, an anode of the photodiode is set to a negative potential of −0.6 V. Furthermore, the gate of the transfer transistor is set to a negative potential of −1.8 V. Therefore, the transfer transistor is reliably turned off. The gate of the reset transistor in the pixel signal generation unit 320 is set to 2.2 V. Therefore, the reset transistor is turned on, and the charge amount of the floating diffusion layer 324 is initialized. The positive potential-side reference potential of the pixel signal generation unit 320 is set to 2.8 V.

Although not illustrated in FIG. 13A, in a case where the address event detection is performed, the gate of the OFG transistor is set to about 2.2 to 2.8 V. Furthermore, the low-potential-side reference potential of the address event detector 400 is set to a ground potential GND (0 V) higher than the anode potential of the photodiode. The positive potential-side reference potential of the address event detector 400 is set to 2.2 V.

As illustrated in FIG. 13B, in a case where the transfer transistor is turned on, the anode of the photodiode is also set to −0.6 V. Furthermore, the gate of the transfer transistor is set to 2.2 V. The gate of the reset transistor in the pixel signal generation unit 320 is set to a negative potential of −0.6 V. The drain of the reset transistor is set to 2.2 V. The drain of the amplification transistor 322 in the pixel signal generation unit 320 is set to 2.8 V.

Although not illustrated in FIG. 13A, the gate of the OFG transistor is set to −1.8 V. The low-potential-side reference potential of the address event detector 400 is the ground potential GND (0 V) as in FIG. 13A.

As described above, in the first embodiment, the low-potential-side reference potential and the off-potential used by each unit in the imaging device 100 include three or more types of potentials having different potential levels. Therefore, the operation of each unit in the imaging device 100 can be optimized. For example, since the low-potential-side reference potential of the photoelectric conversion unit 334 is set to the reference potential, the sensitivity of the photodiode can be improved, and the dark current can be reduced. Furthermore, by setting the low-potential-side reference potential of the address event detector 400 higher than the low-potential-side reference potential of the photoelectric conversion unit 334, a sufficient reverse bias is applied to the photodiode, so that noise reduction and an improvement in response speed can be achieved. Moreover, by setting the off-potential of the transfer controller 335 to a negative potential, the transfer transistor and the OFG transistor can be reliably operated exclusively.

Second Embodiment

FIG. 14 is a diagram illustrating the low-potential-side reference potential and the off-potential used by each unit in the imaging device 100 according to the second embodiment. Also in the example of FIG. 14, three types of reference potentials having different potential levels are used as the low-potential-side reference potential and the off-potential used by each unit in the imaging device 100, but the potential levels of these three types of reference potentials are different from those in FIG. 12. More specifically, the first reference potential in FIG. 14 is at a potential level higher than the ground potential GND, and the second reference potential is at a potential level lower than the ground potential GND.

The second reference potential is supplied from the negative potential supply unit 235. The first reference potential is supplied from a power supply unit (not illustrated).

In the example of FIG. 14, the low-potential-side reference potentials of the photoelectric conversion unit 334, the pixel signal generation unit 320, and the column ADC 220 are the ground potential GND (0 V). Furthermore, the low-potential-side reference potential of the address event detector 400 is the first reference potential that is a positive potential. Furthermore, the off-potential of the transfer controller 335 is the second reference potential that is a negative potential lower than the first reference potential.

In the case of FIG. 14, since the low-potential-side reference potential of the photoelectric conversion unit 334 is set to lower than the low-potential-side reference potential of the address event detector 400, the reverse bias of the photodiode in the photoelectric conversion unit 334 can be sufficiently increased, and noise reduction and an improvement in response speed can be achieved. In addition, since the off-potential of the transfer controller 335 is set to the second reference potential that is a negative potential lower than the first reference potential, the transfer transistor and the OFG transistor can be reliably operated exclusively.

Figure 15A:
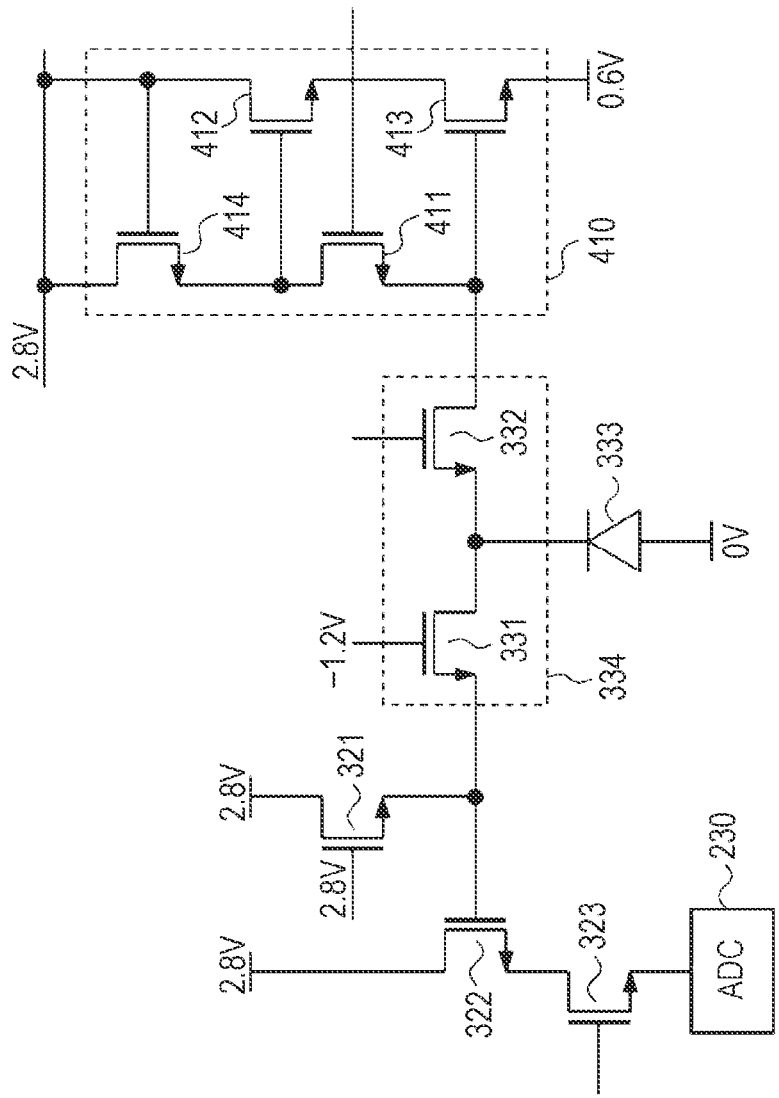
FIG. 15A is a diagram illustrating an example of a potential level in a case where a transfer transistor of the second embodiment is turned off.
Figure 15B:
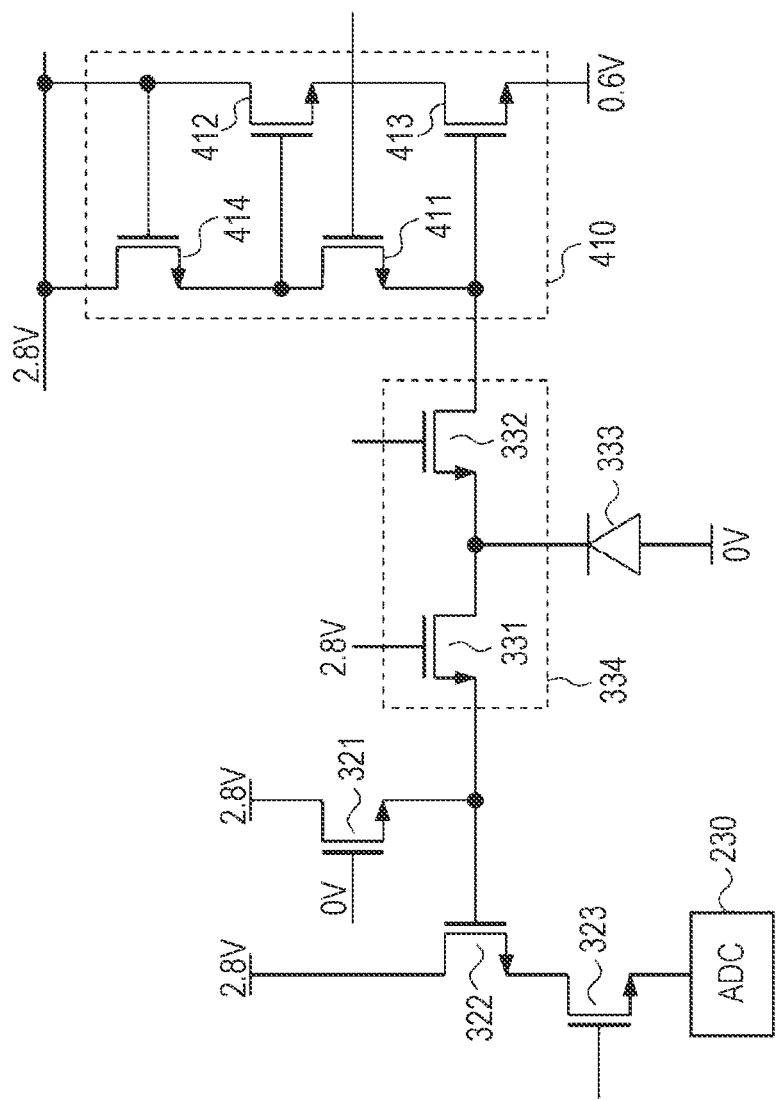

FIGS. 15A and 15B are examples of specific potential levels of the low-potential-side reference potential and the off-potential provided to each unit in the imaging device 100 according to the second embodiment. FIG. 15A illustrates the potential level in a case where the transfer transistor is turned off, and FIG. 15B illustrates the potential level in a case where the transfer transistor is turned on.

As illustrated in FIG. 15A, in a case where the transfer transistor is turned off, the anode of the photodiode is set to a ground potential GND (0 V) that is a negative potential. Furthermore, the gate of the transfer transistor is set to a negative potential of −1.2 V. Therefore, the transfer transistor is reliably turned off. The gate of the reset transistor in the pixel signal generation unit 320 is set to 2.8 V. Therefore, the reset transistor is turned on, and the charge amount of the floating diffusion layer 324 is initialized. The positive potential-side reference potential of the pixel signal generation unit 320 is set to 2.8 V. The low-potential-side reference potential of the address event detector 400 is set to 0.6 V higher than the anode potential of the photodiode. The positive potential-side reference potential of the address event detector 400 is set to 2.8 V.

As illustrated in FIG. 15B, in a case where the transfer transistor is turned on, the anode of the photodiode is also set to the ground potential GND (0 V). Furthermore, the gate of the transfer transistor is set to 2.8 V. The gate of the reset transistor in the pixel signal generation unit 320 is set to the ground potential GND (0 V). The drain of the reset transistor is set to 2.8 V. The drain of the amplification transistor 322 in the pixel signal generation unit 320 is set to 2.8 V.

In FIGS. 13A, 13B, 15A, and 15B, 2.2 V and 2.8 V are mixed as the positive potential-side reference potential, but these are examples, and the positive potential-side reference potential may be set to a specific potential.

As described above, in the second embodiment, since the first reference potential of the positive potential and the second reference potential of the negative potential are provided as the low-potential-side reference potential and the off-potential in the imaging device 100 in addition to the ground potential GND, it is possible to set the low-potential-side reference potential of the optimum voltage level in each unit in the imaging device 100 and to optimize the operation of each unit. In particular, by setting the low-potential-side reference potential of the address event detector 400 higher than the low-potential-side reference potential of the photoelectric conversion unit 334, a sufficient reverse bias is applied to the photodiode, so that noise reduction and an improvement in response speed can be achieved. Moreover, by setting the off-potential of the transfer controller 335 to a negative potential, the transfer transistor and the OFG transistor can be reliably operated exclusively.

Furthermore, in the second embodiment, since only one type of negative potential is used as the low-potential-side reference potential and the off-potential, the circuit configuration of the negative potential supply unit 235 can be simplified.

Third Embodiment

Figure 16:
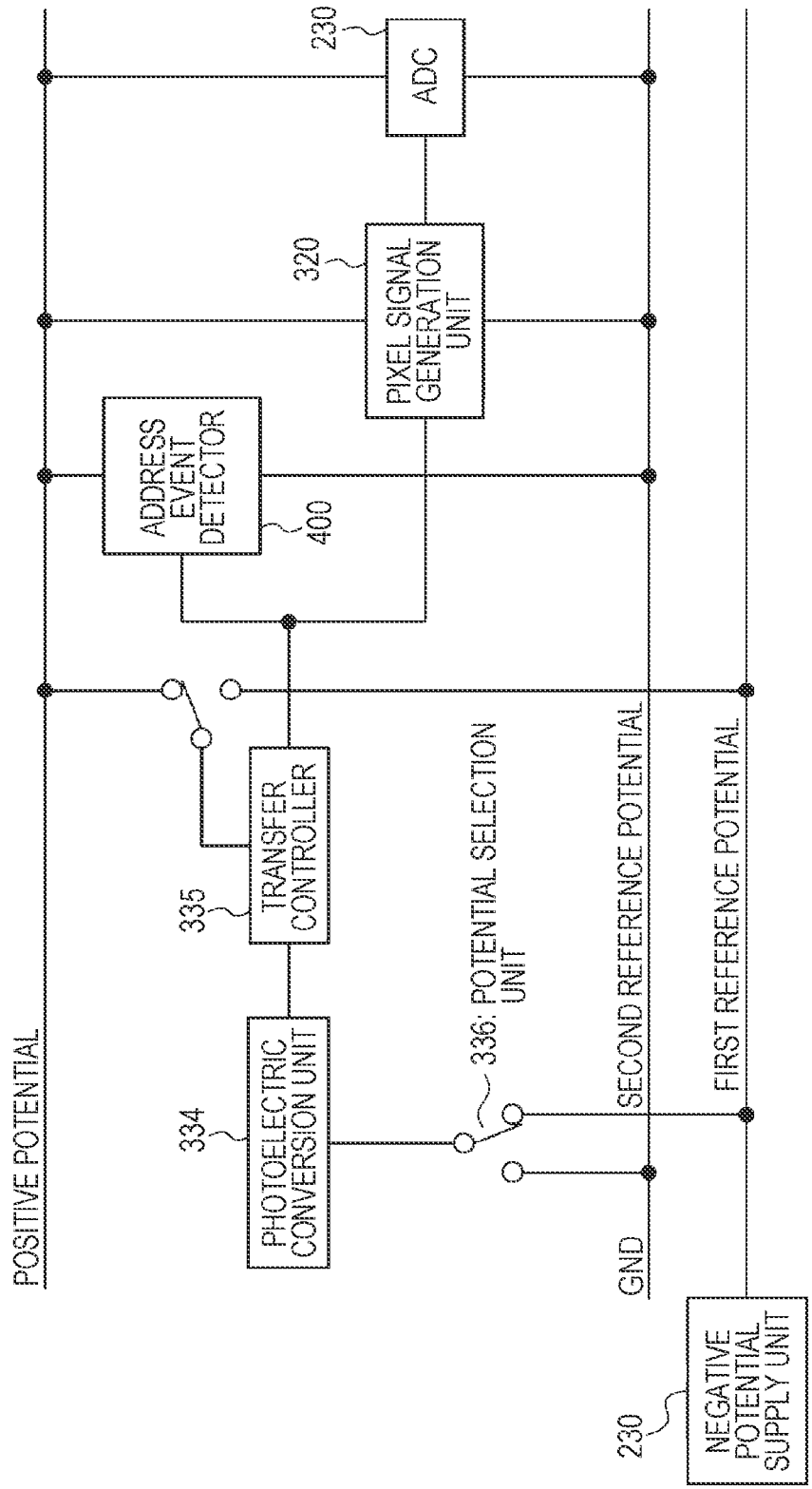
FIG. 16 is a diagram illustrating a low-potential-side reference potential and an off-potential used by each unit in an imaging device according to a third embodiment.

FIG. 16 is a diagram illustrating the low-potential-side reference potential and the off-potential used by each unit in the imaging device 100 according to a third embodiment.

As illustrated in FIG. 16, the imaging device 100 according to the third embodiment includes a potential selection unit 336 that switches a low-potential-side reference potential of a photoelectric conversion unit 334. The potential selection unit 336 selects the first reference potential during a period in which the address event detector 400 detects whether or not the amount of change in the electric signal (the photovoltaic current) photoelectrically converted by the photodiode in the address event detector 400 exceeds a predetermined threshold value, and selects the second reference potential having a potential level higher than the first reference potential during a period in which the analog-to-digital converter converts the pixel signal into a digital signal.

The low-potential-side reference potential and the off-potential used by each unit of the imaging device 100 according to the third embodiment are the first reference potential and the second reference potential having different potential levels, respectively. That is, the third embodiment has one less number of reference potentials than the first and second embodiments.

The second reference potential in the third embodiment is, for example, a ground potential GND (0 V), and the first reference potential is a negative potential having a potential level lower than that of the ground potential GND. The first reference potential is supplied from the negative potential supply unit 235.

In the imaging device 100 of FIG. 16, the low-potential-side reference potential of the address event detector 400, the pixel signal generation unit 320, and the column ADC 220 is the ground potential GND (the second reference potential). The off-potential of the transfer controller 335 is a negative potential (the first reference potential).

The address event detector 400 needs to quickly detect an address event on the basis of an electric signal photoelectrically converted by a photodiode in the photoelectric conversion unit 334. Therefore, during the period in which the address event detector 400 performs the address event detection operation, the low-potential-side reference potential of the photoelectric conversion unit 334 is lowered to the negative potential to improve the sensitivity of the photodiode and reduce the dark current. On the other hand, when the address event is detected by the address event detector 400, the operation of generating the pixel signal is performed by the pixel signal generation unit 320, but since it is not necessary to improve the sensitivity of the photodiode within this period, the low-potential-side reference potential of the receiving unit is set to the ground potential GND, and the power consumption is reduced.

As described above, in the third embodiment, since the low-potential-side reference potential of the photoelectric conversion unit 334 is switched between the case of performing the address event detection and the case of generating the pixel signal, the sensitivity of the photodiode at the time of address event detection can be improved and the dark current can be reduced, and the power consumption at the time of generating the pixel signal can be reduced.

Fourth Embodiment

Figure 17:
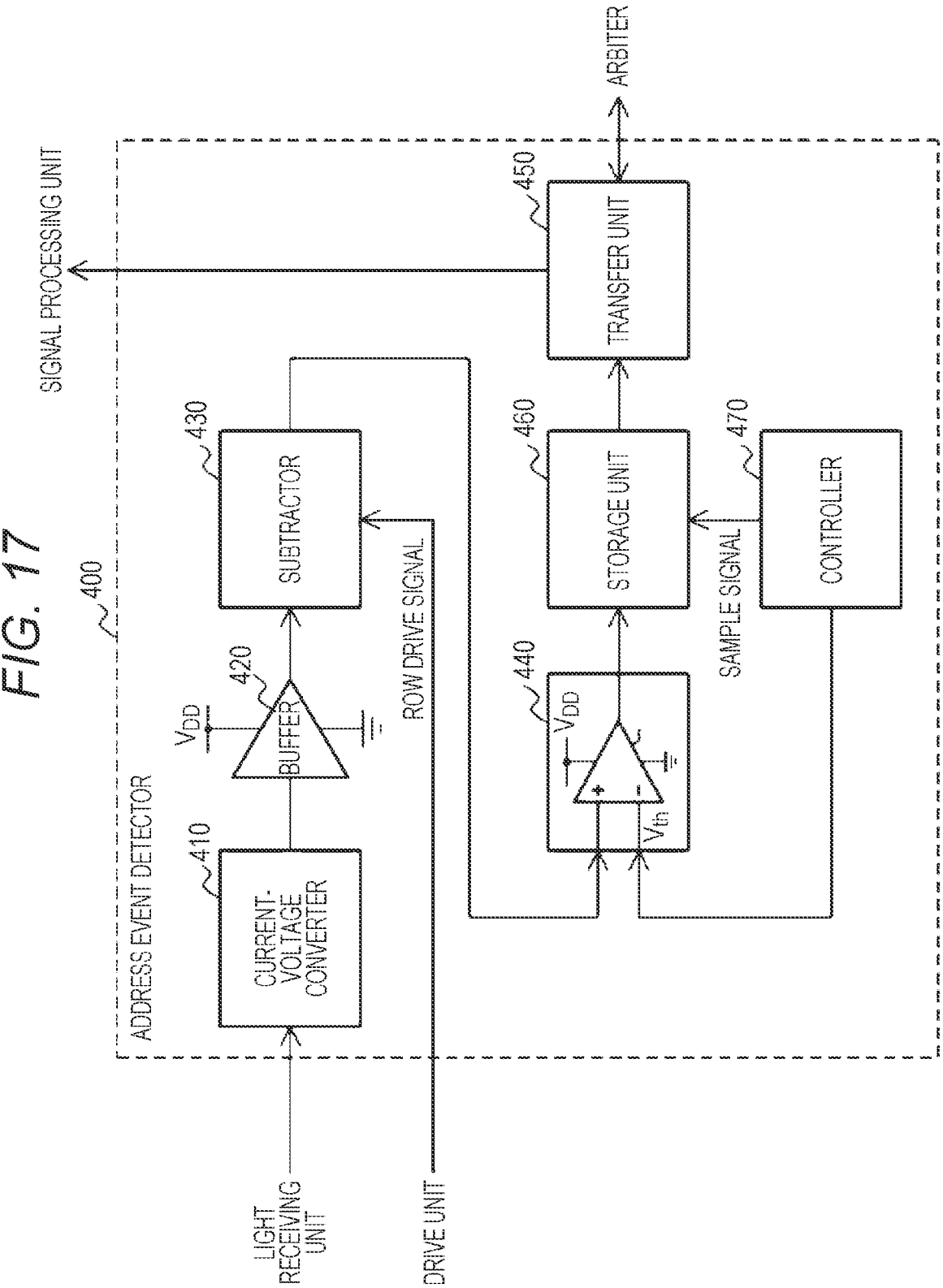
FIG. 17 is a block diagram illustrating a second configuration example of an address event detector.

In the first to third embodiments described above, the imaging device 100 including the address event detector 400 in FIG. 6 has been described, but an internal configuration of the address event detector 400 is not necessarily limited to FIG. 6. FIG. 17 is a block diagram illustrating a second configuration example of the address event detector 400. As illustrated in FIG. 17, the address event detector 400 according to the present configuration example includes a storage unit 460 and a controller 470 in addition to the current-voltage converter 410, the buffer 420, the subtractor 430, the quantizer 440, and the transfer unit 450.

The storage unit 460 is provided between the quantizer 440 and the transfer unit 450, and accumulates the output of the quantizer 440, that is, the comparison result of the comparator 441 in the quantizer 440 on the basis of the sample signal supplied from the controller 470. The storage unit 460 may be a sampling circuit such as a switch, plastic, or a capacitor, or may be a digital memory circuit such as a latch or a flip-flop.

The controller 470 supplies a predetermined threshold value voltage $V_{th}$ to an inverting (−) input terminal of the comparator 441. The threshold value voltage $V_{th}$ supplied from the controller 470 to the comparator 441 may have different voltage values in a time division manner. For example, the controller 470 supplies the threshold value voltage $V_{th1}$ corresponding to the on-event indicating that the amount of change in the photovoltaic current exceeds the upper limit threshold value and the threshold value voltage $V_{th2}$ corresponding to the off-event indicating that the amount of change falls below the lower limit threshold value at different timings, so that one comparator 441 can detect a plurality of types of address events.

For example, the storage unit 460 may accumulate the comparison result of the comparator 441 using the threshold value voltage $V_{th1}$ corresponding to the on-event in a period in which the threshold value voltage $V_{th2}$ corresponding to the off-event is supplied from the controller 470 to the inversion (−) input terminal of the comparator 441. Note that the storage unit 460 may be inside the pixel 30 or may be outside the pixel 30. Furthermore, the storage unit 460 is not an essential configuration element of the address event detector 400. That is, the storage unit 460 may be omitted.

[Imaging Device 100 (Scanning Method) According to Second Configuration Example]

An imaging device 10020 including the first configuration example of the address event detector 400 illustrated in FIG. 6 described above is an asynchronous imaging device 100 that reads an event by an asynchronous reading method. However, the event reading method is not limited to the asynchronous reading method, and may be a synchronous reading method. The imaging device 100 to which the synchronous readout method is applied is the same scanning type imaging device 100 as the normal imaging device 100 that performs imaging at a predetermined frame rate.

Figure 18:
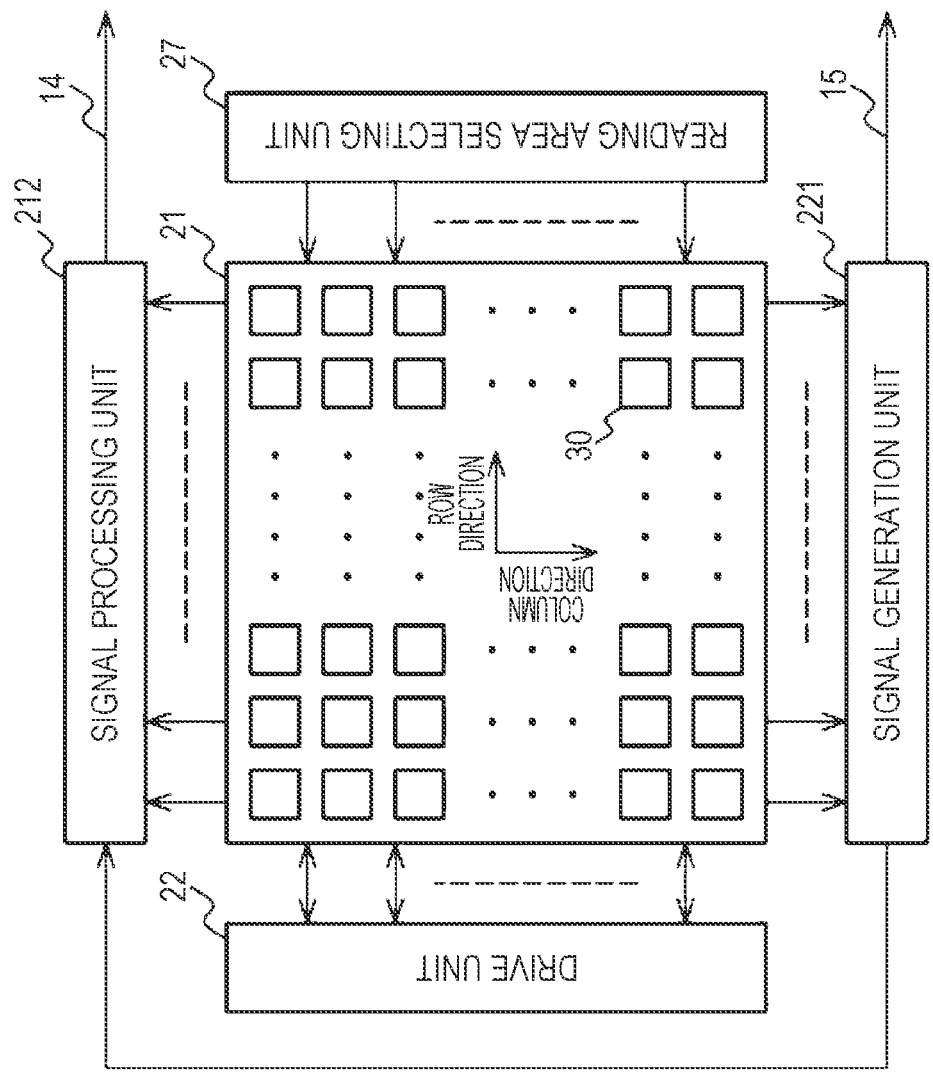
FIG. 18 is a block diagram illustrating an example of a configuration of a scanning type imaging device.

FIG. 18 is a block diagram illustrating an example of a configuration of the imaging device 10020 according to the second configuration example, that is, the scanning type imaging device 100 used as the imaging device 100 in an imaging system 10 to which the technology according to the present disclosure is applied.

As illustrated in FIG. 18, the imaging device 100 according to the second configuration example as the imaging device 10020 of the present disclosure includes a pixel array unit 21, a drive unit 22, a signal processing unit 25, a reading area selecting unit 27, and a signal generation unit 221.

The pixel array unit 21 includes a plurality of pixels 30. The plurality of pixels 30 outputs an output signal in response to the selection signal of the reading area selecting unit 27. Each of the plurality of pixels 30 may have a quantizer in the pixel as illustrated in FIG. 7, for example. The plurality of pixels 30 outputs an output signal corresponding to the amount of change in the intensity of light. The plurality of pixels 30 may be two-dimensionally arranged in a matrix as illustrated in FIG. 18.

The drive unit 22 drives each of the plurality of pixels 30 to output the pixel signal generated in each pixel 30 to the signal processing unit 25. Note that the drive unit 22 and the signal processing unit 25 are circuit units for acquiring gradation information. Therefore, in a case where only the event information is acquired, the drive unit 22 and the signal processing unit 25 may not be provided.

The reading area selecting unit 27 selects some of the plurality of pixels 30 included in the pixel array unit 21. For example, the reading area selecting unit 27 selects any one or a plurality of rows among the rows included in the structure of the two-dimensional matrix corresponding to the pixel array unit 21. The reading area selecting unit 27 sequentially selects one or a plurality of rows according to a preset cycle. Furthermore, the reading area selecting unit 27 may determine the selected area in response to a request from each pixel 30 of the pixel array unit 21.

The signal generation unit 221 generates an event signal corresponding to the active pixel in which the event has been detected among the selected pixels on the basis of the output signal of the pixel selected by the reading area selecting unit 27. The event is an event in which the intensity of light changes. The active pixel is a pixel in which the amount of change in the intensity of light corresponding to the output signal exceeds or falls below a preset threshold value. For example, the signal generation unit 221 compares the output signal of the pixel with a reference signal, detects an active pixel that outputs the output signal in a case where the output signal is larger or smaller than the reference signal, and generates an event signal corresponding to the active pixel.

The signal generation unit 221 can include, for example, a column selection circuit that arbitrates a signal entering the signal generation unit 221. Furthermore, the signal generation unit 221 can be configured to output not only the information of the active pixel that has detected the event but also the information of the inactive pixel that has not detected the event.

The address information and the time stamp information (for example, (X, Y, T)) of the active pixel in which the event has been detected are output from the signal generation unit 221 through an output line 15. However, the data output from the signal generation unit 221 may be not only the address information and the time stamp information but also information in a frame format (for example, (0, 0, 1, 0, . . . )).

[Configuration Example of Chip Structure]

As a chip (semiconductor integrated circuit) structure of the imaging device 10020 according to the first configuration example or the second configuration example described above, a stacked chip structure can be adopted as illustrated in FIG. 2. The stacked chip structure, that is, the stacked structure has a structure in which at least two chips of the light receiving chip 201 as a first chip and the detection chip 202 as a second chip are stacked. Then, in the circuit configuration of the pixel 30 illustrated in FIG. 4, each of the light receiving units 330 is disposed on the light receiving chip 201, and all elements other than the light receiving element 311, elements of other circuit portions of the pixel 30, and the like are disposed on the detection chip 202. The light receiving chip 201 and the detection chip 202 are electrically connected via a connection portion such as a via (VIA), Cu—Cu bonding, or a bump.

Note that, here, a configuration example in which the light receiving element 311 is disposed on the light receiving chip 201, and elements other than the light receiving element 311, elements of other circuit portions of the pixel 30, and the like are disposed on the detection chip 202 has been exemplified, but the present invention is not limited to this configuration example.

For example, in the circuit configuration of the pixel 30 illustrated in FIG. 4, each element of the light receiving unit 330, the reset transistor 321 of a pixel signal generation unit 32032, and the floating diffusion layer 324 may be arranged in the light receiving chip 201, and the other elements may be arranged in the detection chip 202. Alternatively, some of the elements configuring the address event detector 400 may be disposed on the light receiving chip 201 together with each element of the light receiving unit 330 and the like.

[Configuration Example of Column Processing Unit]

FIG. 9 illustrates a configuration example in which the analog-to-digital converter (ADC) 230 is disposed in the column ADC 220 in a one-to-one correspondence with the pixel column of the pixel array unit 21, but the present invention is not limited to this configuration example. For example, the analog-to-digital converter (ADC) 230 may be disposed in units of a plurality of pixel columns, and the analog-to-digital converter (ADC) 230 may be used in a time division manner between the plurality of pixel columns.

The analog-to-digital converter (ADC) 230 converts the analog pixel signal SIG supplied via the vertical signal line VSL into a digital signal having a larger number of bits than the detection signal of the address event described above. For example, when the detection signal of the address event is 2-bits, the pixel signal is converted into a digital signal of 3-bits or more (16 bits or the like). The analog-to-digital converter (ADC) 230 supplies the digital signal generated by the analog-digital conversion to the signal processing unit 25.

[Regarding Noise Event]

By the way, the imaging device 10020 according to the first configuration example is an asynchronous imaging device 100 called DVS including, for each pixel 30, a detector (that is, the address event detector 400) that detects, for each pixel address, that the light amount of the pixel exceeds a predetermined threshold value as an address event in real time.

In the imaging device 100 according to the asynchronous first configuration example, when some event (that is, a true event) originally occurs in the scene, data due to the occurrence of the true event is acquired. However, in the asynchronous imaging device 100, there is a case where data is wastefully acquired due to a noise event (a false event) such as sensor noise even in a scene where no true event occurs. Therefore, not only the noise signal is read, but also the throughput of the signal output is reduced.

<Application Example of Technology According to Present Disclosure>

The technology according to the present disclosure can be applied to various products. Hereinafter, a more specific application example will be described. For example, the technology according to the present disclosure may be realized as a distance measuring device mounted on any type of mobile body such as an automobile, an electric vehicle, a hybrid electric vehicle, a motorcycle, a bicycle, a personal mobility, an airplane, a drone, a ship, a robot, a construction machine, and an agricultural machine (tractor).

[Mobile Body]

Figure 19:
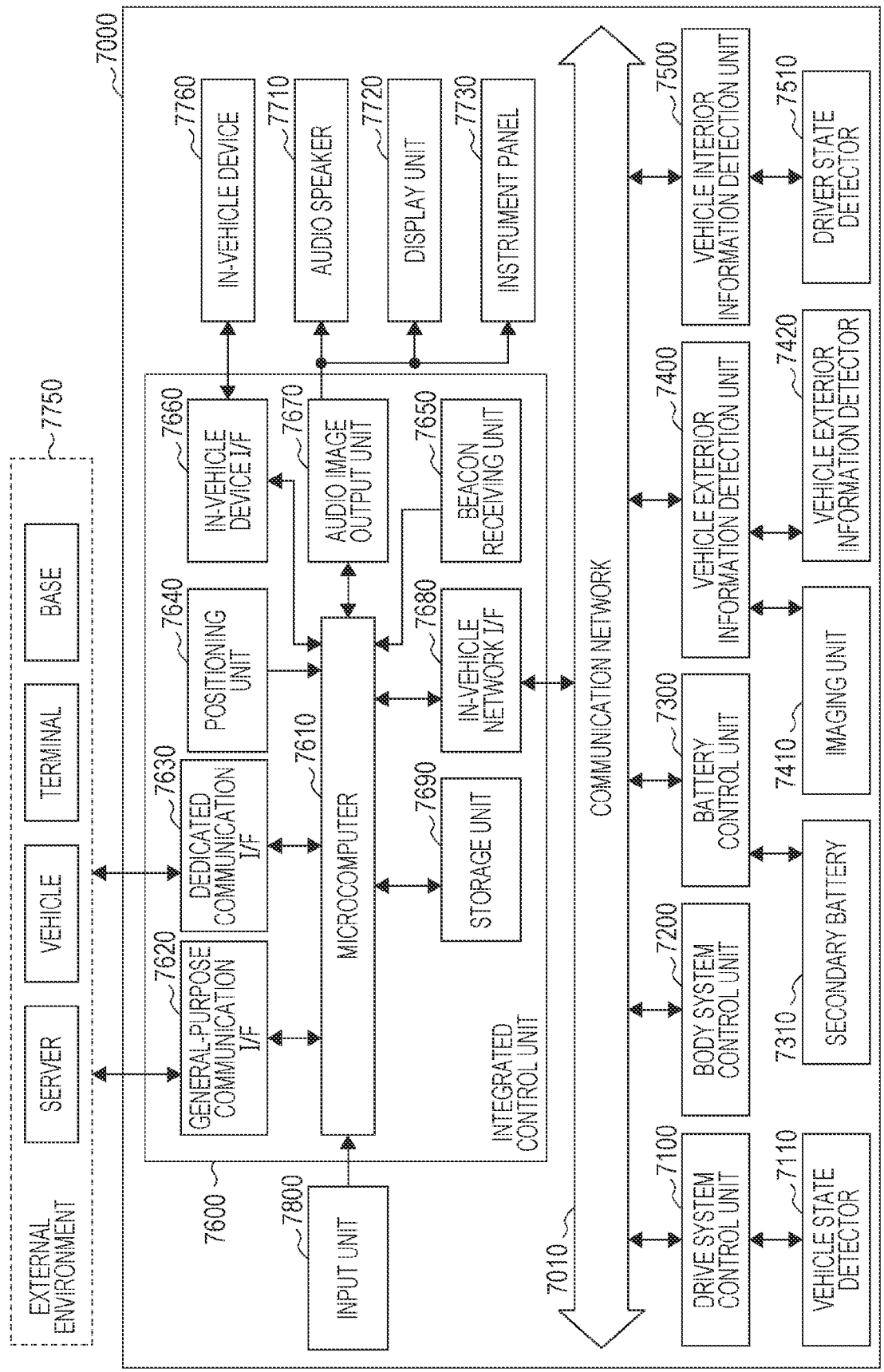
FIG. 19 is a block diagram illustrating a schematic configuration example of a vehicle control system which is an example of a mobile body control system.

FIG. 19 is a block diagram illustrating a schematic configuration example of a vehicle control system 7000 which is an example of a mobile body control system to which the technology according to the present disclosure can be applied. The vehicle control system 7000 includes a plurality of electronic control units connected via a communication network 7010. In the example illustrated in FIG. 19, the vehicle control system 7000 includes a drive system control unit 7100, a body system control unit 7200, a battery control unit 7300, a vehicle exterior information detection unit 7400, a vehicle interior information detection unit 7500, and an integrated control unit 7600. The communication network 7010 connecting the plurality of control units may be, for example, an in-vehicle communication network conforming to an arbitrary standard such as a controller area network (CAN), a local interconnect network (LIN), a local area network (LAN), or FlexRay (registered trademark).

Each control unit includes a microcomputer (processor) that performs arithmetic processing according to various programs, a storage unit that stores programs executed by the microcomputer, parameters used for various calculations, or the like, and a drive circuit that drives various devices to be controlled. Each control unit includes a network I/F for communicating with other control units via the communication network 7010, and a communication I/F for communicating with devices, sensors, or the like inside and outside the vehicle by wired communication or wireless communication. In FIG. 19, as a functional configuration of the integrated control unit 7600, a microcomputer 7610, a general-purpose communication I/F 7620, a dedicated communication I/F 7630, a positioning unit 7640, a beacon receiving unit 7650, an in-vehicle device I/F 7660, an audio image output unit 7670, an in-vehicle network I/F 7680, and a storage unit 7690 are illustrated. The other control units similarly include a microcomputer, a communication I/F, a storage unit, and the like.

The drive system control unit 7100 controls the operation of devices related to the drive system of the vehicle according to various programs. For example, the drive system control unit 7100 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like. The drive system control unit 7100 may have a function as a control device such as an antilock brake system (ABS) or an electronic stability control (ESC).

A vehicle state detector 7110 is connected to the drive system control unit 7100. The vehicle state detector 7110 includes, for example, at least one of a gyro sensor that detects an angular velocity of axial rotational motion of a vehicle body, an acceleration sensor that detects acceleration of the vehicle, or a sensor for detecting an operation amount of an accelerator pedal, an operation amount of a brake pedal, a steering angle of a steering wheel, an engine speed, a wheel rotation speed, or the like. The drive system control unit 7100 performs arithmetic processing using a signal input from the vehicle state detector 7110, and controls an internal combustion engine, a driving motor, an electric power steering device, a brake device, or the like.

The body system control unit 7200 controls operations of various devices mounted on the vehicle body according to various programs. For example, the body system control unit 7200 functions as a control device of a keyless entry system, a smart key system, a power window device, or various lamps such as a head lamp, a back lamp, a brake lamp, a blinker, or a fog lamp. In this case, radio waves transmitted from a portable device that substitutes for a key or signals of various switches can be input to the body system control unit 7200. The body system control unit 7200 receives input of these radio waves or signals, and controls a door lock device, a power window device, a lamp, and the like of the vehicle.

The battery control unit 7300 controls a secondary battery 7310, which is a power supply source of the driving motor, according to various programs. For example, information such as a battery temperature, a battery output voltage, or a remaining capacity of a battery is input to the battery control unit 7300 from a battery device including the secondary battery 7310. The battery control unit 7300 performs arithmetic processing using these signals, and performs temperature adjustment control of the secondary battery 7310 or control of a cooling device or the like included in the battery device.

The vehicle exterior information detection unit 7400 detects information outside the vehicle on which the vehicle control system 7000 is mounted. For example, at least one of an imaging unit 7410 or a vehicle exterior information detector 7420 is connected to the vehicle exterior information detection unit 7400. The imaging unit 7410 includes at least one of a time of flight (ToF) camera, a stereo camera, a monocular camera, an infrared camera, or other cameras. The vehicle exterior information detector 7420 includes, for example, at least one of an environment sensor for detecting current climate or weather, or a surrounding information detection sensor for detecting another vehicle, an obstacle, a pedestrian, or the like around the vehicle on which the vehicle control system 7000 is mounted.

The environment sensor may be, for example, at least one of a raindrop sensor that detects rainy weather, a fog sensor that detects fog, a sunshine sensor that detects a degree of sunshine, and a snow sensor that detects snowfall. The surrounding information detection sensor may be at least one of an ultrasonic sensor, a radar device, or a light detection and ranging, laser imaging detection and ranging (LIDAR) device. The imaging unit 7410 and the vehicle exterior information detector 7420 may be provided as independent sensors or devices, or may be provided as a device in which a plurality of sensors or devices is integrated.

Figure 20:
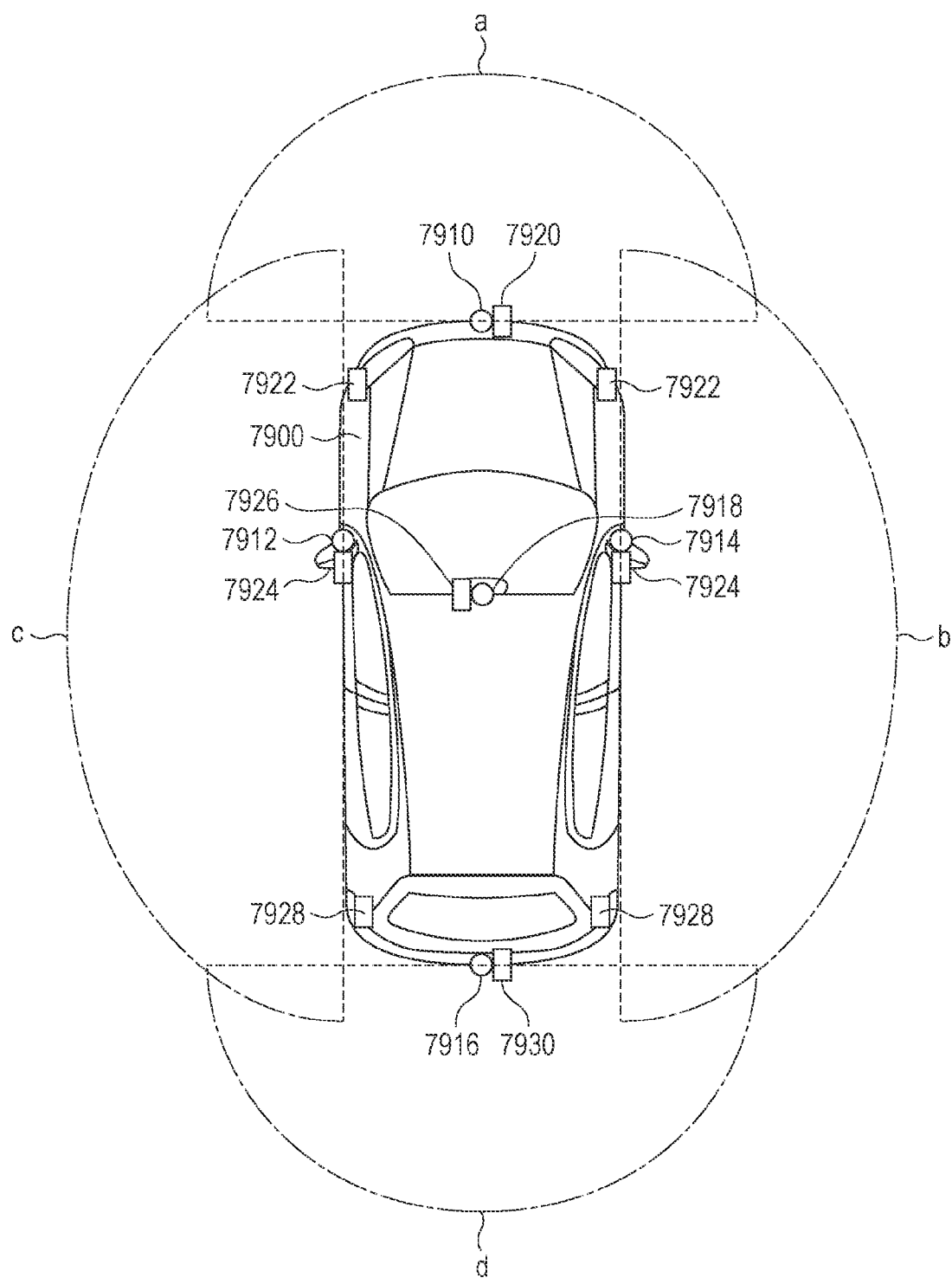
FIG. 20 is a diagram illustrating an example of installation positions of an imaging unit and a vehicle exterior information detector.

Here, FIG. 20 is a diagram illustrating an example of installation positions of the imaging unit 7410 and the vehicle exterior information detector 7420. The imaging units 7910, 7912, 7914, 7916, and 7918 are provided, for example, at least one position of a front nose, a side mirror, a rear bumper, a back door, or an upper portion of a windshield in a vehicle interior of a vehicle 7900. The imaging unit 7910 provided at the front nose and the imaging unit 7918 provided at the upper portion of the windshield in the vehicle interior mainly acquire images in front of the vehicle 7900. The imaging units 7912 and 7914 provided at the side mirrors mainly acquire images of the sides of the vehicle 7900. The imaging unit 7916 provided on the rear bumper or the back door mainly acquires an image behind the vehicle 7900. The imaging unit 7918 provided at the upper portion of the windshield in the vehicle interior is mainly used to detect a preceding vehicle, a pedestrian, an obstacle, a traffic light, a traffic sign, a lane, or the like.

Note that FIG. 20 illustrates an example of imaging ranges of the respective imaging units 7910, 7912, 7914, and 7916. An imaging range a indicates an imaging range of the imaging unit 7910 provided at the front nose, imaging ranges b and c indicate imaging ranges of the imaging units 7912 and 7914 provided at the side mirrors, respectively, and an imaging range d indicates an imaging range of the imaging unit 7916 provided at the rear bumper or the back door. For example, by superimposing pieces of image data captured by the imaging units 7910, 7912, 7914, and 7916, an overhead view image of the vehicle 7900 viewed from above can be obtained.

Vehicle exterior information detectors 7920, 7922, 7924, 7926, 7928, and 7930 provided at the front, rear, sides, corners, and the upper portion of the windshield in the vehicle interior of the vehicle 7900 may be, for example, ultrasonic sensors or radar devices. The vehicle exterior information detectors 7920, 7926, and 7930 provided at the front nose, the rear bumper, the back door, and the upper portion of the windshield in the vehicle interior of the vehicle 7900 may be, for example, LIDAR devices. These vehicle exterior information detectors 7920 to 7930 are mainly used for detecting a preceding vehicle, a pedestrian, an obstacle, or the like.

Returning to FIG. 19, the description will be continued. The vehicle exterior information detection unit 7400 causes the imaging unit 7410 to capture an image outside the vehicle, and receives the captured image data. Furthermore, the vehicle exterior information detection unit 7400 receives detection information from the connected vehicle exterior information detector 7420. In a case where the vehicle exterior information detector 7420 is an ultrasonic sensor, a radar device, or a LIDAR device, the vehicle exterior information detection unit 7400 transmits ultrasonic waves, electromagnetic waves, or the like, and receives information of received reflected waves. The vehicle exterior information detection unit 7400 may perform object detection processing or distance detection processing of a person, a vehicle, an obstacle, a sign, a character on a road surface, or the like on the basis of the received information. The vehicle exterior information detection unit 7400 may perform environment recognition processing of recognizing rainfall, fog, road surface conditions, or the like on the basis of the received information. The vehicle exterior information detection unit 7400 may calculate a distance to an object outside the vehicle on the basis of the received information.

Furthermore, the vehicle exterior information detection unit 7400 may perform image recognition processing or distance detection processing of recognizing a person, a car, an obstacle, a sign, a character on a road surface, or the like on the basis of the received image data. The vehicle exterior information detection unit 7400 may perform processing such as distortion correction or alignment on the received image data, and combine image data captured by different imaging units 7410 to generate a bird's-eye view image or a panoramic image. The vehicle exterior information detection unit 7400 may perform viewpoint conversion processing using image data captured by different imaging units 7410.

The vehicle interior information detection unit 7500 detects information inside the vehicle. For example, a driver state detector 7510 that detects a state of a driver is connected to the vehicle interior information detection unit 7500. The driver state detector 7510 may include a camera that captures the driver, a biological sensor that detects biological information of the driver, a microphone that collects audio in the vehicle interior, or the like. The biological sensor is provided, for example, on a seat surface, a steering wheel, or the like, and detects biological information of an occupant sitting on a seat or a driver holding the steering wheel. The vehicle interior information detection unit 7500 may calculate the degree of fatigue or the degree of concentration of the driver or may determine whether or not the driver is dozing on the basis of the detection information input from the driver state detector 7510. The vehicle interior information detection unit 7500 may perform processing such as noise canceling processing on the collected audio signal.

The integrated control unit 7600 controls the overall operation in the vehicle control system 7000 according to various programs. An input unit 7800 is connected to the integrated control unit 7600. The input unit 7800 is realized by, for example, a device such as a touch panel, a button, a microphone, a switch, or a lever that can be operated by an occupant for input. Data obtained by performing audio recognition on the audio input by the microphone may be input to the integrated control unit 7600. The input unit 7800 may be, for example, a remote control device using infrared rays or other radio waves, or an external connection device such as a mobile phone or a personal digital assistant (PDA) corresponding to the operation of the vehicle control system 7000. The input unit 7800 may be, for example, a camera, and in this case, the passenger can input information by gesture. Alternatively, data obtained by detecting the movement of the wearable device worn by the passenger may be input. Furthermore, the input unit 7800 described above may include, for example, an input control circuit or the like that generates an input signal on the basis of information input by the occupant or the like using the input unit 7800 and outputs the input signal to the integrated control unit 7600. By operating the input unit 7800, the occupant or the like inputs various data to the vehicle control system 7000 or instructs a processing operation.

The storage unit 7690 may include a read only memory (ROM) that stores various programs to be executed by the microcomputer, and a random access memory (RAM) that stores various parameters, calculation results, sensor values, or the like. Furthermore, the storage unit 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may implement a cellular communication protocol such as global system of mobile communications (GSM) (registered trademark), WiMAX, long term evolution (LTE), or LTE-advanced (LTE-A), or another wireless communication protocol such as wireless LAN (also referred to as Wi-Fi (registered trademark)) or Bluetooth (registered trademark). The general-purpose communication I/F 7620 may be connected to a device (for example, an application server or a control server) existing on an external network (for example, the Internet, a cloud network, or a company-specific network) via, for example, a base station or an access point. Furthermore, the general-purpose communication I/F 7620 may be connected to a terminal (for example, a terminal of a driver, a pedestrian, or a store, or a machine type communication (MTC) terminal) existing in the vicinity of the vehicle using, for example, a Peer to Peer (P2P) technology.

The dedicated communication I/F 7630 is a communication I/F that supports a communication protocol formulated for use in a vehicle. For example, the dedicated communication I/F 7630 may implement a standard protocol such as wireless access in vehicle environment (WAVE) which is a combination of IEEE 802.11p of the lower layer and IEEE 1609 of the upper layer, dedicated short range communications (DSRC), or a cellular communication protocol. The dedicated communication I/F 7630 typically performs V2X communication which is a concept including one or more of vehicle to vehicle communication, vehicle to infrastructure communication, vehicle to home communication, and vehicle to pedestrian communication.

The positioning unit 7640 receives, for example, a global navigation satellite system (GNSS) signal from a GNSS satellite (for example, a global positioning system (GPS) signal from a GPS satellite), executes positioning, and generates position information including the latitude, longitude, and altitude of the vehicle. Note that the positioning unit 7640 may specify the current position by exchanging signals with a wireless access point, or may acquire the position information from a terminal such as a mobile phone, a PHS, or a smartphone having a positioning function.

The beacon receiving unit 7650 receives, for example, radio waves or electromagnetic waves transmitted from a wireless station or the like installed on a road, and acquires information such as a current position, a traffic jam, a closed road, a required time, or the like. Note that the function of the beacon receiving unit 7650 may be included in the dedicated communication I/F 7630 described above.

The in-vehicle device I/F 7660 is a communication interface that mediates connection between the microcomputer 7610 and various in-vehicle devices 7760 existing in the vehicle. The in-vehicle device I/F 7660 may establish wireless connection using a wireless communication protocol such as wireless LAN, Bluetooth (registered trademark), near field communication (NFC), or wireless USB (WUSB). Furthermore, the in-vehicle device I/F 7660 may establish wired connection such as universal serial bus (USB), high-definition multimedia interface (HDMI) (registered trademark), or mobile high-definition link (MHL) via a connection terminal (and, if necessary, a cable) not illustrated. The in-vehicle device 7760 may include, for example, at least one of a mobile device or a wearable device possessed by a passenger, or an information device carried in or attached to the vehicle. Furthermore, the in-vehicle device 7760 may include a navigation device that searches for a route to an arbitrary destination. The in-vehicle device I/F 7660 exchanges a control signal or a data signal with these in-vehicle devices 7760.

The in-vehicle network I/F 7680 is an interface that mediates communication between the microcomputer 7610 and the communication network 7010. The in-vehicle network I/F 7680 transmits and receives signals and the like in accordance with a predetermined protocol supported by the communication network 7010.

The microcomputer 7610 of the integrated control unit 7600 controls the vehicle control system 7000 according to various programs on the basis of information acquired via at least one of the general-purpose communication I/F 7620, the dedicated communication I/F 7630, the positioning unit 7640, the beacon receiving unit 7650, the in-vehicle device I/F 7660, or the in-vehicle network I/F 7680. For example, the microcomputer 7610 may calculate a control target value of the driving force generation device, the steering mechanism, or the braking device on the basis of the acquired information regarding the inside and outside of the vehicle, and output a control command to the drive system control unit 7100. For example, the microcomputer 7610 may perform cooperative control for the purpose of implementing functions of an advanced driver assistance system (ADAS) including collision avoidance or impact mitigation of the vehicle, follow-up traveling based on an inter-vehicle distance, vehicle speed maintenance traveling, vehicle collision warning, vehicle lane departure warning, or the like. Furthermore, the microcomputer 7610 may perform cooperative control for the purpose of automatic driving or the like in which the vehicle autonomously travels without depending on the operation of the driver by controlling the driving force generation device, the steering mechanism, the braking device, or the like on the basis of the acquired information around the vehicle.

The microcomputer 7610 may generate three-dimensional distance information between the vehicle and an object such as a surrounding structure or a person on the basis of information acquired via at least one of the general-purpose communication I/F 7620, the dedicated communication I/F 7630, the positioning unit 7640, the beacon receiving unit 7650, the in-vehicle device I/F 7660, or the in-vehicle network I/F 7680, and create local map information including surrounding information of the current position of the vehicle. Furthermore, the microcomputer 7610 may predict danger such as collision of the vehicle, approach of a pedestrian or the like, or entry into a closed road on the basis of the acquired information, and generate a warning signal. The warning signal may be, for example, a signal for generating a warning sound or turning on a warning lamp.

The audio image output unit 7670 transmits an output signal of at least one of an audio or an image to an output device capable of visually or audibly notifying an occupant of the vehicle or the outside of the vehicle of information. In the example of FIG. 19, an audio speaker 7710, a display unit 7720, and an instrument panel 7730 are illustrated as the output device. The display unit 7720 may include, for example, at least one of an on-board display and a head-up display. The display unit 7720 may have an augmented reality (AR) display function. The output device may be another device other than these devices, such as a wearable device such as a headphone or an eyeglass-type display worn by a passenger, a projector, or a lamp. In a case where the output device is a display device, the display device visually displays results obtained by various processes performed by the microcomputer 7610 or information received from another control unit in various formats such as text, images, tables, and graphs. Furthermore, in a case where the output device is an audio output device, the audio output device converts an audio signal including reproduced audio data, audio data, or the like into an analog signal and aurally outputs the analog signal.

Note that, in the example illustrated in FIG. 19, at least two control units connected via the communication network 7010 may be integrated as one control unit. Alternatively, each control unit may include a plurality of control units. Further, the vehicle control system 7000 may include another control unit (not illustrated). In addition, in the above description, some or all of the functions performed by any of the control units may be provided to another control unit. That is, as long as information is transmitted and received via the communication network 7010, predetermined arithmetic processing may be performed by any control unit. Similarly, a sensor or a device connected to any of the control units may be connected to another control unit, and a plurality of control units may mutually transmit and receive detection information via the communication network 7010.

An example of the vehicle control system to which the technology according to the present disclosure can be applied has been described above. The technology according to the present disclosure can be applied to, for example, the imaging units 7910, 7912, 7914, 7916, and 7918, the vehicle exterior information detectors 7920, 7922, 7924, 7926, 7928, and 7930, the driver state detector 7510, and the like, among the above-described configurations. Specifically, the imaging system 10 in FIG. 1 including the imaging device 100 of the present disclosure can be applied to these imaging units and detectors. Then, by applying the technology according to the present disclosure, the influence of a noise event such as sensor noise can be mitigated, and the occurrence of a true event can be reliably and quickly sensed, so that safe vehicle traveling can be achieved.

Note that the present disclosure can have the following configurations.

(1) An imaging device including
a photoelectric conversion unit including a plurality of photoelectric conversion elements each of which photoelectrically converts incident light to generate an electric signal,
a detector configured to output a detection signal indicating whether or not an amount of change in the electric signal of each of the plurality of photoelectric conversion elements exceeds a predetermined threshold value,
a pixel signal generation unit configured to generate a pixel signal on the basis of the electric signal,
a transfer controller configured to perform control to transfer the electric signal to the pixel signal generation unit, and
an analog-to-digital converter configured to convert the pixel signal into a digital signal,
in which a low-potential-side reference potential of the photoelectric conversion unit, a low-potential-side reference potential of the detector, a low-potential-side reference potential of the pixel signal generation unit, a low-potential-side reference potential of the analog-to-digital converter, and an off-potential of the transfer controller include three or more potentials having different potential levels.

(2) The imaging device according to (1), in which a potential level of the low-potential-side reference potential of the photoelectric conversion unit is lower than a potential level of the low-potential-side reference potential of the detector.

(3) The imaging device according to (1) or (2), in which a potential level of the low-potential-side reference potential of the photoelectric conversion unit is higher than a potential level of the off-potential of the transfer controller.

(4) The imaging device according to any one of (1) to (3), in which the potential level of the low-potential-side reference potential of the photoelectric conversion unit is lower than the potential level of the low-potential-side reference potential of at least one of the pixel signal generation unit and the analog-to-digital converter.

(5) The imaging device according to any one of (1) to (4), in which at least one of the low-potential-side reference potential of the photoelectric conversion unit, the low-potential-side reference potential of the detector, the low-potential-side reference potential of the pixel signal generation unit, the low-potential-side reference potential of the analog-to-digital converter, and the off-potential of the transfer controller is a ground potential, at least one of the others is a first reference potential having a potential level lower than the ground potential, and at least one of the others is a second reference potential having a potential level lower than the first reference potential.

(6) The imaging device according to (5), in which the low-potential-side reference potential of the photoelectric conversion unit is the second reference potential,
the low-potential-side reference potentials of the detector, the pixel signal generation unit, and the analog-to-digital converter are the ground potentials, and the off-potential of the transfer controller is the second reference potential.

(7) The imaging device according to (5) or (6), in which the ground potential is 0 V,
the first reference potential is a negative potential, and
the second reference potential is a negative potential having a potential level lower than that of the first reference potential.

(8) The imaging device according to any one of (1) to (3), in which the low-potential-side reference potentials of the photoelectric conversion unit, the pixel signal generation unit, and the analog-to-digital converter are substantially equal.

(9) The imaging device according to any one of (1) to (3) and (8), in which at least one of the low-potential-side reference potential of the photoelectric conversion unit, the low-potential-side reference potential of the detector, the low-potential-side reference potential of the pixel signal generation unit, the low-potential-side reference potential of the analog-to-digital converter, and the off-potential of the transfer controller is a ground potential, at least one of the others is a first reference potential having a potential level lower than the ground potential, and at least one of the others is a second reference potential having a potential level higher than the ground potential.

(10) The imaging device according to (9), in which the low-potential-side reference potentials of the photoelectric conversion unit, the pixel signal generation unit, and the analog-to-digital converter are the ground potentials,
the low-potential-side reference potential of the detector is the first reference potential, and
the off-potential of the transfer controller is the second reference potential.

(11) The imaging device according to (9) or (10), in which the ground potential is 0 V,
the first reference potential is a positive potential, and
the second reference potential is a negative potential.

(12) An imaging device including
a photoelectric conversion unit including a plurality of photoelectric conversion elements each of which photoelectrically converts incident light to generate an electric signal,
a detector configured to output a detection signal indicating whether or not an amount of change in the electric signal of each of the plurality of photoelectric conversion elements exceeds a predetermined threshold value,
a pixel signal generation unit configured to generate a pixel signal on the basis of the electric signal,
a transfer controller configured to perform control to transfer the electric signal to the pixel signal generation unit,
an analog-to-digital converter configured to convert the pixel signal into a digital signal, and
a potential selection unit configured to switch a low-potential-side reference potential of the photoelectric conversion unit. (13) The imaging device according to (12), in which the analog-to-digital converter converts the pixel signal into the digital signal when the detector detects that the amount of change exceeds the predetermined threshold value, and
the potential selection unit selects a first reference potential within a period in which the detector detects whether or not the amount of change exceeds the predetermined threshold value, and selects a second reference potential having a higher potential level than that of the first reference potential within a period in which the analog-to-digital converter converts the pixel signal into the digital signal.

(14) The imaging device according to (13), in which the first reference potential is a negative potential, and
the second reference potential is a ground potential.

(15) The imaging device according to any one of (12) to (14), in which the low-potential-side reference potential of the photoelectric conversion unit, the low-potential-side reference potential of the detector, the low-potential-side reference potential of the pixel signal generation unit, the low-potential-side reference potential of the analog-to-digital converter, and the off-potential of the transfer controller include two or more potentials having different potential levels.

(16) The imaging device according to any one of (12) to (15), in which the low-potential-side reference potential of the detector, the low-potential-side reference potential of the pixel signal generation unit, and the low-potential-side reference potential of the analog-to-digital converter are the ground potentials, and
the off-potential of the transfer controller is the negative potential.

(17) The imaging device according to any one of (5) to (7), (9) to (11), and (13), further including a potential generation unit configured to generate at least one of the first reference potential and the second reference potential.

(18) The imaging device according to any one of (1) to (17), in which at least the detector is disposed on a second substrate stacked on a first substrate on which the photoelectric conversion unit is disposed.

(19) The imaging device according to any one of (1) to (18), in which a back gate of a transistor in the transfer controller is set to a potential at a same potential level as the low-potential-side reference potential of the photoelectric conversion unit.

(20) An electronic apparatus including
an imaging device configured to output captured image data, and
a processor configured to perform predetermined signal processing to the image data,
in which the imaging device includes
a photoelectric conversion unit including a plurality of photoelectric conversion elements each of which photoelectrically converts incident light to generate an electric signal,
a detector configured to output a detection signal indicating whether or not an amount of change in the electric signal of each of the plurality of photoelectric conversion elements exceeds a predetermined threshold value,
a pixel signal generation unit configured to generate a pixel signal on the basis of the electric signal,
a transfer controller configured to perform control to transfer the electric signal to the pixel signal generation unit, and an analog-to-digital converter configured to convert the pixel signal into a digital signal, and
in which a low-potential-side reference potential of the photoelectric conversion unit, a low-potential-side reference potential of the detector, a low-potential-side reference potential of the pixel signal generation unit, a low-potential-side reference potential of the analog-to-digital converter, and an off-potential of the transfer controller include three or more potentials having different potential levels.

(21) An imaging method including
a step of photoelectrically converting incident light with a plurality of photoelectric conversion elements to generate an electric signal,
a step of outputting a detection signal indicating whether or not an amount of change in the electric signal of each of the plurality of photoelectric conversion elements exceeds a predetermined threshold value,
a step of transferring the electric signal,
a step of generating a pixel signal on the basis of the transferred electric signal, and
a step of converting the pixel signal into a digital signal,
in which a low-potential-side reference potential at the time of the photoelectric conversion, a low-potential-side reference potential at the time of outputting the detection signal, a low-potential-side reference potential at the time of generating the pixel signal, a low-potential-side reference potential at the time of converting the pixel signal into a digital signal, and an off-potential at the time of transferring the electric signal include three or more potentials having different potential levels, and
using these potentials, the step of generating the electric signal, the step of outputting the detection signal, the step of transferring the electric signal, the step of generating the pixel signal, and the step of converting the detection signal into the digital signal are performed.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions can be made without departing from the conceptual idea and spirit of the present disclosure derived from the contents defined in the claims and equivalents thereof.

REFERENCE SIGNS LIST

100 Imaging device
110 Imaging lens
120 Recording unit
130 Controller
200 Solid-state image sensing device
201 Light receiving chip
202 Detection chip
211 Drive circuit
212 Signal processing unit
213 Arbiter
220 Column ADC
221 Signal generation unit
223 Reference signal generation unit
222 Output unit
230 ADC
235 Negative potential supply unit
236 Comparator
237 Counter
238 Switch
239 Memory
240 Differential amplifier circuit
241, 242, 412 P-type transistor
243, 244, 245, 411, 413 N-type transistor
250 Counter
300 Pixel array unit
310 Pixel block
311 Pixel
312 Normal pixel
313 Address event detection pixel
320 Pixel signal generation unit
321 Reset transistor
322 Amplification transistor
323 Selection transistor 324 Floating diffusion layer
330 Light receiving unit
331 Transfer transistor
332 OFG transistor
333 Photoelectric conversion element
334 Photoelectric conversion unit
335 Transfer controller
400 Address event detector
410 Current-voltage converter
420 Buffer
430 Subtractor
431, 433 Capacitor
432 Inverter
434 Switch
440 Quantizer
441 Comparator
450 Transfer unit
12031 Imaging unit

The invention claimed is:

1. An imaging device comprising:
a photoelectric conversion unit including a plurality of photoelectric conversion elements each of which photoelectrically converts incident light to generate an electric signal;
a detector configured to output a detection signal indicating whether or not an amount of change in the electric signal of each of the plurality of photoelectric conversion elements exceeds a predetermined threshold value;
a pixel signal generation unit configured to generate a pixel signal on a basis of the electric signal;
a transfer controller configured to perform control to transfer the electric signal to the pixel signal generation unit; and
an analog-to-digital converter configured to convert the pixel signal into a digital signal,
wherein a low-potential-side reference potential of the photoelectric conversion unit, a low-potential-side reference potential of the detector, a low-potential-side reference potential of the pixel signal generation unit, a low-potential-side reference potential of the analog-to-digital converter, and an off-potential of the transfer controller include three or more potentials having different levels.

2. The imaging device according to claim 1, wherein a potential level of the low-potential-side reference potential of the photoelectric conversion unit is lower than a potential level of the low-potential-side reference potential of the detector.

3. The imaging device according to claim 1, wherein a potential level of the low-potential-side reference potential of the photoelectric conversion unit is higher than a potential level of the off-potential of the transfer controller.

4. The imaging device according to claim 1, wherein a potential level of the low-potential-side reference potential of the photoelectric conversion unit is lower than the potential level of the low-potential-side reference potential of at least one of the pixel signal generation unit and the analog-to-digital converter.

5. The imaging device according to claim 1, wherein at least one of the low-potential-side reference potential of the photoelectric conversion unit, the low-potential-side reference potential of the detector, the low-potential-side reference potential of the pixel signal generation unit, the low-potential-side reference potential of the analog-to-digital converter, and the off-potential of the transfer controller is a ground potential, at least one of other potentials is a first reference potential having a potential level lower than the ground potential, and at least one of the other potentials is a second reference potential having a potential level lower than the first reference potential.

6. The imaging device according to claim 5, wherein the low-potential-side reference potential of the photoelectric conversion unit is the second reference potential,
the low-potential-side reference potentials of the detector, the pixel signal generation unit, and the analog-to-digital converter are the ground potential, and
the off-potential of the transfer controller is the second reference potential.

7. The imaging device according to claim 5, wherein the ground potential is 0 V,
the first reference potential is a negative potential, and
the second reference potential is a negative potential having a potential level lower than that of the first reference potential.

8. The imaging device according to claim 1, wherein the low-potential-side reference potentials of the photoelectric conversion unit, the pixel signal generation unit, and the analog-to-digital converter are substantially equal.

9. The imaging device according to claim 1, wherein at least one of the low-potential-side reference potential of the photoelectric conversion unit, the low-potential-side reference potential of the detector, the low-potential-side reference potential of the pixel signal generation unit, the low-potential-side reference potential of the analog-to-digital converter, and the off-potential of the transfer controller is a ground potential, at least one of other potentials is a first reference potential having a potential level higher than the ground potential, and at least one of the other potentials is a second reference potential having a potential level lower than the ground potential.

10. The imaging device according to claim 9, wherein the low-potential-side reference potentials of the photoelectric conversion unit, the pixel signal generation unit, and the analog-to-digital converter are the ground potential,
the low-potential-side reference potential of the detector is the first reference potential, and
the off-potential of the transfer controller is the second reference potential.

11. The imaging device according to claim 9, wherein the ground potential is 0 V,
the first reference potential is a positive potential, and
the second reference potential is a negative potential.

12. The imaging device according to claim 5, further comprising a potential generation unit configured to generate at least one of the first reference potential and the second reference potential.

13. The imaging device according to claim 1, wherein at least the detector is disposed on a second substrate stacked on a first substrate on which the photoelectric conversion unit is disposed.

14. The imaging device according to claim 1, wherein a back gate of a transistor in the transfer controller is set to a potential at a same potential level as the low-potential-side reference potential of the photoelectric conversion unit.

15. An imaging device comprising:
a photoelectric conversion unit including a plurality of photoelectric conversion elements each of which photoelectrically converts incident light to generate an electric signal;
a detector configured to output a detection signal indicating whether or not an amount of change in the electric signal of each of the plurality of photoelectric conversion elements exceeds a predetermined threshold value;

a pixel signal generation unit configured to generate a pixel signal on a basis of the electric signal;
a transfer controller configured to perform control to transfer the electric signal to the pixel signal generation unit;
an analog-to-digital converter configured to convert the pixel signal into a digital signal; and
a potential selection unit configured to switch a low-potential-side reference potential of the photoelectric conversion unit.

16. The imaging device according to claim 15, wherein the analog-to-digital converter converts the pixel signal into the digital signal when the detector detects that the amount of change exceeds the predetermined threshold value, and
the potential selection unit selects a first reference potential within a period in which the detector detects whether or not the amount of change exceeds the predetermined threshold value, and selects a second reference potential having a higher potential level than that of the first reference potential within a period in which the analog-to-digital converter converts the pixel signal into the digital signal.

17. The imaging device according to claim 16, wherein the first reference potential is a negative potential, and
the second reference potential is a ground potential.

18. The imaging device according to claim 15, wherein the low-potential-side reference potential of the photoelectric conversion unit, the low-potential-side reference potential of the detector, the low-potential-side reference potential of the pixel signal generation unit, the low-potential-side reference potential of the analog-to-digital converter, and an off-potential of the transfer controller include two or more potentials having different potential levels.

19. The imaging device according to claim 15, wherein the low-potential-side reference potential of the detector, the low-potential-side reference potential of the pixel signal generation unit, and the low-potential-side reference potential of the analog-to-digital converter are a ground potential, and
an off-potential of the transfer controller is a negative potential.

20. An electronic apparatus comprising:
an imaging device configured to output captured image data; and
a processor configured to perform predetermined signal processing to the image data,
wherein the imaging device includes
a photoelectric conversion unit including a plurality of photoelectric conversion elements each of which photoelectrically converts incident light to generate an electric signal,
a detector configured to output a detection signal indicating whether or not an amount of change in the electric signal of each of the plurality of photoelectric conversion elements exceeds a predetermined threshold value,
a pixel signal generation unit configured to generate a pixel signal on a basis of the electric signal,
a transfer controller configured to perform control to transfer the electric signal to the pixel signal generation unit, and
an analog-to-digital converter configured to convert the pixel signal into a digital signal, and
wherein a low-potential-side reference potential of the photoelectric conversion unit, a low-potential-side reference potential of the detector, a low-potential-side reference potential of the pixel signal generation unit, a low-potential-side reference potential of the analog-to-digital converter, and an off-potential of the transfer controller include three or more potentials having different potential levels.

21. An imaging method comprising:
a step of photoelectrically converting incident light with a plurality of photoelectric conversion elements to generate an electric signal;
a step of outputting a detection signal indicating whether or not an amount of change in the electric signal of each of the plurality of photoelectric conversion elements exceeds a predetermined threshold value;
a step of transferring the electric signal;
a step of generating a pixel signal on a basis of the transferred electric signal; and
a step of converting the pixel signal into a digital signal,
wherein a low-potential-side reference potential at a time of the photoelectric conversion, a low-potential-side reference potential at the time of outputting the detection signal, a low-potential-side reference potential at the time of generating the pixel signal, a low-potential-side reference potential at the time of converting the pixel signal into a digital signal, and an off-potential at the time of transferring the electric signal include three or more potentials having different potential levels, and
using these potentials, the step of generating the electric signal, the step of outputting the detection signal, the step of transferring the electric signal, the step of generating the pixel signal, and the step of converting the detection signal into the digital signal are performed.

* * * * *